(12) United States Patent
Wen et al.

(10) Patent No.: US 7,493,388 B2
(45) Date of Patent: Feb. 17, 2009

(54) METHOD AND/OR SYSTEM FOR IDENTIFYING INFORMATION APPLIANCES

(75) Inventors: Chih-Po Wen, Redwood City, CA (US);
John Thorpe, Sunnyvale, CA (US);
Charles Marker, Los Altos, CA (US)

(73) Assignee: BDNA Corporation, Mountain View, CA (US)

( * ) Notice: Subject to any disclaimer, the term of this patent is extended or adjusted under 35 U.S.C. 154(b) by 104 days.

(21) Appl. No.: 11/207,557

(22) Filed: Aug. 19, 2005

(65) Prior Publication Data

US 2006/0064619 A1 Mar. 23, 2006

Related U.S. Application Data

(60) Provisional application No. 60/603,501, filed on Aug. 20, 2004.

(51) Int. Cl.
*G06F 15/13* (2006.01)

(52) U.S. Cl. ............ 709/224; 709/218; 709/220; 709/223; 709/225; 705/28; 705/29

(58) Field of Classification Search ......... 709/218, 709/220, 223, 224, 225; 705/28, 29
See application file for complete search history.

(56) References Cited

U.S. PATENT DOCUMENTS

| | | | |
|---|---|---|---|
| 7,188,170 B1 * | 3/2007 | Burnley et al. | 709/224 |
| 2002/0013825 A1 * | 1/2002 | Freivald et al. | 709/218 |
| 2002/0087665 A1 * | 7/2002 | Marshall et al. | 709/220 |
| 2003/0126236 A1 * | 7/2003 | Marl et al. | 709/220 |
| 2004/0162748 A1 * | 8/2004 | Vogel et al. | 705/8 |
| 2005/0015489 A1 * | 1/2005 | Whynot et al. | 709/225 |

* cited by examiner

*Primary Examiner*—Jinsong Hu
(74) *Attorney, Agent, or Firm*—Ronald Craig Fish

(57) ABSTRACT

Methods and/or systems for identifying and/or representing information appliances on a communication system retrieve data sets and store signature data for later identification of individual information systems.

24 Claims, 21 Drawing Sheets

```
<!--Matching, Updating, Element Creation Rules -->
  <matchRule name="createDeviceFromOSL2Info"
    lookupOnly="false"
    sourceTypeFullName="root.types.resource.software.operatingSystem"
    targetTypeFullName="root.types.resource.device"
    minMatches="1" >
    <matchRuleAttribute sourceAttributeName="deviceUniqueID"
       targetAttributeName="deviceUniqueID" />
    <createXML><![CDATA[ my $srcElt = $source{"elementFullName"};
    my $srcId = $source{"elementId"};
    my $devId = $source{"deviceUID"};
# create new device element with identification-related attributes
    my $srcSerialNumber = $source{"deviceUniqueID"};
    my $srcNics = $source{"systemMacAddresses"};
    my $srcHostName = $source{"hostName"};
    my $deviceType = $source{"deviceType"}; my $eltName = "device_$devId";
    my $type = "root.types.resource." . $deviceType;
    my $parent = "root.\$bdna.deviceFolder";
    my $eltFullName = "$parent.$eltName";
    $result = "<result>";
    $result .=  &elementXML($eltName, $type, $parent) .
      &dataXML($eltFullName, "name", "Device $devId") .
      &dataXML($eltFullName, "hostNames", $srcHostName) .
      &dataXML($srcElt, "deviceFullName", $eltFullName)        ;
    if ($srcNics) {$result .= &dataXML($eltFullName, "systemMacAddresses", $srcNics);}
    if ($srcSerialNumber) {
      $result .=&dataXML($eltFullName, "deviceUniqueID", $srcSerialNumber);}
    $result .= "</result>";]]></createXML>
   <updateXML><![CDATA[ my $srcElt = $source{"elementFullName"};
    my $targetElt = $target{"elementFullName"};
    my $srcSerialNumber = $source{"deviceUniqueID"};
    my $targetSerialNumber = $target{"deviceUniqueID"};
    my $srcNics = $source{"systemMacAddresses"};
    my $targetNics = $target{"systemMacAddresses"};
    my $srcHostName = $source{"hostName"};
    my $targetHostName = $target{"hostNames"};
# assert relationship from source to target device data element
    $result = "<result>";
    $result .= &dataXML($srcElt, "deviceFullName", $targetElt);
# update device identification attributes when a new value is available
    if ($srcNics && !($srcNics eq $targetNics)) {
      $result .= &dataXML($targetElt , "systemMacAddresses", $srcNics);}
    if ($srcSerialNumber && ! ($srcSerialNumber eq $targetSerialNumber))
    {$result .= &dataXML($targetElt , "deviceUniqueID", $srcSerialNumber);}
    if ($srcHostName) {
      my $curr = $BDNA_Separator . $targetHostName . $BDNA_Separator;
      my $new = $BDNA_Separator . $srcHostName . $BDNA_Separator;
      if (!($curr =~ /$new/)) {
        $result .= &dataXML($targetElt, "hostNames", $targetHostName .
$BDNA_Separator . $srcHostName);        }   }
    $result .= "</result>"; ]]></updateXML> </matchRule>
```

*FIG. 4*

Example Java Program Source Listing
```
* Copyright 2004 - BDNA Corporation; All Rights Reserved
/* Fire all applicable match_ rules for the given time period */
 public boolean checkMatchRules(Timestamp startTime, Timestamp cutoffTime)
   throws BDNAException
  {Connection conn = null;
   PreparedStatement pstmt = null;
   ResultSet rs = null;
   String sql = null;
   int creates = 0;
   int updates = 0;
   try {  /* log start of processing in the control service log */
    LogUtil.info("MessagesBundle", "com.bdna.match.start_checking_match_rule",
       new ArrayList(), "com.bdna.controlService");
/*make sure this is the latest vesion of the metadata and the value index*/
    m_schema.refreshMetadata();
    Schema.refreshDataMatchIndex();
/*find elements whose match attributes have changed.*/
    conn = DBConnectionPool.getConnection();
    HashMap elts = new HashMap();
    String sql1 = m_opt.getOptimizedSQL("default",find_new_element_to_match");
    String sql2 = m_opt.getOptimizedSQL("default","find_new_rule_to_match");
    sql = sql1 + " union " + sql2;
    pstmt = conn.prepareStatement(sql);
    pstmt.setTimestamp(1, startTime);
    pstmt.setTimestamp(2, cutoffTime);
    pstmt.setTimestamp(3, startTime);
    pstmt.setTimestamp(4, cutoffTime);
    rs = pstmt.executeQuery();
    while (rs.next()) { long eid = rs.getLong(1); long rid = rs.getLong(2);
      HashSet hs = (HashSet) elts.get(new Long(eid));
      if (hs == null) {
       hs = new HashSet();
       elts.put(new Long(eid), hs);      }
      hs.add(new Long(rid));     }
    rs.close();
    pstmt.close();
/* for each element, read source element atttributes and perform match.*/
    for (Iterator eiter = elts.entrySet().iterator(); eiter.hasNext();) {
      Map.Entry entry = (Map.Entry) eiter.next();
      Long eid = (Long) entry.getKey();
      HashSet rules = (HashSet) entry.getValue();
      ArrayList largs = new ArrayList();
      largs.add(eid.toString());
      LogUtil.info("MessagesBundle", "com.bdna.match.start_processing_element",
       largs, "com.bdna.controlService");
/* fail each element independently */
      boolean locked = false;
      ArrayList applicableRules = new ArrayList();
/* load all source attributes */   try {
       HashMap attrs = loadDataForElement(conn, eid.longValue());
/* check all rules to make sure the device element exists/not exist */
       Long teid = null;
```

```
    String resultXML =
      executePerlScript(args, mrule.getCreateXML());
    m_schema.fromXML(resultXML);
    if (m_status != null) {
     m_status.newCreation();
    } ++creates;         }
   } else if (teid != null) {
   // run all applicable updates
    for (Iterator mriter = applicableRules.iterator();
    mriter.hasNext();
    ) {
    MatchRule mrule = (MatchRule) mriter.next();
    LogUtil.info("MessagesBundle", "com.bdna.match.update_for_element",
largs, "com.bdna.controlService");
    String args = getArgumentXML(-1,eid.longValue(),teid.longValue());
    String resultXML = executePerlScript(args, mrule.getUpdateXML());
    m_schema.fromXML(resultXML);
    if (m_status != null) {
     m_status.newUpdate();      }
    ++updates;     }     }
   m_schema.saveToDb();
   m_schema.unCacheAll();
   Schema.refreshDataMatchIndex();
  } catch (Exception ex) {
   ex.printStackTrace();
   ArrayList args = new ArrayList();
   args.add(eid);
   args.add(ex.toString());
   LogUtil.error("MessagesBundle","com.bdna.match.failed_to_match", args,
   "com.bdna.controlService",ex);
  } finally { try {
    if (locked) {Schema.unLockAll(conn); } } catch (Exception ex) {    };
/* lock/unlock turns the autocommit status to false */
    try { conn.setAutoCommit(true);} catch (Exception ex) {    };    }
   LogUtil.info("MessagesBundle", "com.bdna.match.end_processing_element",
     largs, "com.bdna.controlService");          }
  ArrayList args = new ArrayList();
  args.add("" + creates);
  args.add("" + updates);
  LogUtil.info("MessagesBundle", "com.bdna.match.end_checking_match_rule",
     args, "com.bdna.controlService");
  return (creates + updates) > 0;
 } catch (SQLException ex) {ex.printStackTrace();
   throw new BDNAException( "com.bdna.match.failed_to_match",ex.toString());
 }finally {try (rs.close();} catch (Exception ex) {};
     try {pstmt.close();} catch (Exception ex) {};
     try {DBConnectionPool.freeConnection(conn);} catch (Exception ex){};
}}
```

```
        String resultXML =
          executePerlScript(args, mrule.getCreateXML());
        m_schema.fromXML(resultXML);
        if (m_status != null) {
         m_status.newCreation();
        } ++creates;         }
      } else if (teid != null) {
       // run all applicable updates
       for (Iterator mriter = applicableRules.iterator();
       mriter.hasNext();
       ) {
       MatchRule mrule = (MatchRule) mriter.next();
       LogUtil.info("MessagesBundle", "com.bdna.match.update_for_element",
largs, "com.bdna.controlService");
       String args = getArgumentXML(-1,eid.longValue(),teid.longValue());
       String resultXML = executePerlScript(args, mrule.getUpdateXML());
       m_schema.fromXML(resultXML);
       if (m_status != null) {
         m_status.newUpdate();        }
       ++updates;       }    }
     m_schema.saveToDb();
     m_schema.unCacheAll();
     Schema.refreshDataMatchIndex();
     } catch (Exception ex) {
     ex.printStackTrace();
     ArrayList args = new ArrayList();
     args.add(eid);
     args.add(ex.toString());
     LogUtil.error("MessagesBundle","com.bdna.match.failed_to_match", args,
      "com.bdna.controlService",ex);
     } finally { try {
      if (locked) {Schema.unLockAll(conn); } } catch (Exception ex) {      };
/* lock/unlock turns the autocommit status to false */
      try { conn.setAutoCommit(true);} catch (Exception ex) {      };    }
      LogUtil.info("MessagesBundle", "com.bdna.match.end_processing_element",
       largs, "com.bdna.controlService");        }
    ArrayList args = new ArrayList();
    args.add("" + creates);
    args.add("" + updates);
    LogUtil.info("MessagesBundle", "com.bdna.match.end_checking_match_rule",
      args, "com.bdna.controlService");
    return (creates + updates) > 0;
    } catch (SQLException ex) {ex.printStackTrace();
     throw new BDNAException( "com.bdna.match.failed_to_match",ex.toString());
    }finally {try {rs.close();} catch (Exception ex) {};
        try {pstmt.close();} catch (Exception ex) {};
        try {DBConnectionPool.freeConnection(conn);} catch (Exception ex){};
  }}
```

FIG. 5C

| Attrib. Name | Description | Example Value | Notes |
|---|---|---|---|
| serialNumber | The serial number as reported by the operating system, which usually stays with the mother board. | 80fd455f | |
| UniqueID | A optional universally unique ID generated by the system described herein that is placed on a local file system of the machine (if allowed) at the first information collection. This ID is used to help uniquely identify devices, but may not be allowed on all systems and may be deleted or removes on some systems at times. | BDNA_HOST_GUID_START, cleguid=mahler.1083183256000.10006206, timestamp=Wed Apr 28 15:46:46 PDT 2004, inode=246660, path=/tmp/_BDNA_HOST_GUID_DO_NOT_MOVE_, BDNA_HOST_GUID_END | |
| systemMacAddresses | One or more MAC addresses for the network cards attached to the system, such as a built-in NIC or a PCI NIC. In specific embodiments, The list should exclude PCMCIA cards or NICs on a docking station for a laptop. | 00:50:FC:B8:DD:BB | |
| hddSerialNumber | One or more serial numbers from the local (optionally internal only) hard drives. | 3CW0GH77 | |
| cdromSerialNumber | The list of serial numbers from the CDROM/DVDROM drives. | XYZ123ABC | |
| tapedriveSerialNumber | The list of serial numbers from the locally attached tape drives. | MMN1234 | |
| fddSerialNumber | The list of serial numbers from the floppy drives. | ZYAW12E | |
| rebootsTimeStamp | The list of timestamps for all recent reboots. | 2004-04-23 10:57:25.000000000-0700<,> 2004-04-22 19:18:35.000000000-0700<,> 2004-04-22 18:31:33.000000000 -0700 | <,> is the list item delimiter |
| fcPwwn | The list of unique identifiers for the fiber-channel controllers. | 18213KEWYA7P | |
| osComputerName | The computer name (fully qualified with domain) as reported by the OS. | bdnacorp\dev123 | bdnacorp is the Windows domain name, and dev123 is the computer name |
| hwIdentNum | Product identification such as a serial number on software or a die number on a hardware chip, as reported by Microsoft Windows. | R3504657 | |
| hwUUID | Microsoft Windows universally unique identifier (for the Windows installation). | 9ED180A0-1DDE-11B2-8000-FA7E3D30713F | |

*FIG. 6*

| Platform Attribute Availability | Solaris | HP-UX | AIX | Linux | Windows |
|---|---|---|---|---|---|
| serialNumber | Y | Y | Y | NA | Y |
| UniqueID | Y | Y | Y | Y | Y |
| systemMacAddresses | Y | Y | Y | Y | Y |
| hddSerialNumber | Y | NA | Y | NA | NA |
| cdromSerialNumber | Y | NA | Y | NA | NA |
| tapedriveSerialNumber | Y | NA | Y | NA | NA |
| fddSerialNumber | NA | NA | Y | NA | NA |
| rebootsTimeStamp | NA | NA | NA | Y | NA |
| fcPwwn | NA | Y | Y | NA | NA |
| osComputerName | NA | NA | NA | Y | Y |
| hwIdentNum | NA | NA | NA | NA | Y |
| hwUUID | NA | NA | NA | NA | Y |
| **NA indicates Not Available from a particular resource or Not Applicable. | | | | | |

*FIG. 7*

| Match Rule Name | Attributes Considered | Minimum Attributes Collected* | Minimum Attributes Matches** |
|---|---|---|---|
| Generic UNIX Rule (applied to all UNIX variants) | SerialNumber, UniqueID, systemMacAddress, hddSerialNumber, cdromSerialNumber, tapedriveSerialNumber, fddSerialNumber, fcPwwn | 3 | 2 |
| Linux Rule | UniqueID, systemMacAddress, rebootsTimestamp, osComputerName | 4 | 2 |
| Windows Rule | SerialNumber, UniqueID, systemMacAddress, osComputerName, hwIdentNum, hwUUID | 4 | 2 |
| Customer specific rule*** | osComputerName | 1 | 1 |
| * Mininum Attributes Collected specifies the least number of attributes whose values must be available for the system to invoke matching rule. | | | |
| ** Minimum Attributes Matches specifies the least number of attributes that must be identical (or overlap for the list attributes) for the rule to declare a match. | | | |
| *** This rule serves as an example of a customer claiming that all their computers have fixed, stable names that can be used to uniquely identify the machines. | | | |

*FIG. 8*

ELEMENT / ATTRIBUTE DEF. & CATALOGUE

| ELEMENTS | | | | |
|---|---|---|---|---|
| ID | NAME | TYPEID | COLLECTORID | REFRESH |
| 0 | ROOT | | | |
| 1 | TYPES | | | |
| 2 | OS | | | |
| 3 | USER | | | |
| 4 | SUPERUSER | 3 | | |
| 5 | FILE | | | |
| 6 | MEMORY | | | |
| 7 | CPU | | | |
| 8 | PROCESS | | | |
| 9 | HTTP | | | |
| 10 | UNIX | 5 | 206 | |
| 11 | WINDOWS | 5 | 207 | |
| 100 | FINGERPRINT | | | |
| 101 | NETWORK | | | |
| 102 | NIC | | | |
| 103 | SOLARIS 2.7 | 2 | | |
| 104 | HTTP | 9 | | |
| 105 | SUPERUSER | 4 | | |
| 106 | MEMORY | 6 | 216 | |
| 107 | CPU | 7 | 217 | |
| 108 | HTTPD | 8 | | |
| 1000 | DATA | | | |
| 1001 | 1.1.1.0 | 101 | | |
| 1002 | 1.1.1.20 | 102 | | |
| 1003 | SOLARIS 2.7 | 103 | | |
| 1004 | HTTP | 104 | | |
| 1005 | SUPERUSER | 105 | | |
| 1006 | MEMORY | 106 | | |
| 1007 | CPU | 107 | | |

FIG. 13

| | ATTRIBUTES | | |
|---|---|---|---|
| ID | NAME | COLNAME | DATATYPE |
| 49 | TYPE | A1 | STRING |
| 50 | HOSTNAME | A2 | STRING |
| 51 | NAME | A1 | STRING |
| 52 | PASSWORD | A2 | ENCRYPTED |
| 53 | NAME | A1 | STRING |
| 54 | SIZE | A2 | NUMBER |
| 55 | SIZE | A1 | NUMBER |
| 56 | %USED | A2 | NUMBER |
| 57 | CHIPID | A1 | STRING |
| 58 | TYPE | A2 | STRING |
| 59 | SPEED | A3 | NUMBER |
| 60 | %USED | A4 | NUMBER |
| 61 | NAME | A1 | STRING |
| 62 | PORT | A1 | NUMBER |
| 63 | RESPONSE | A2 | STRING |
| 64 | TYPE | A3 | STRING |
| 65 | #PROCESSES | A4 | NUMBER |
| 66 | OWNER | A3 | STRING |
| 67 | ARCHIVE | A4 | STRING |
| 68 | NETWORK | A1 | STRING |
| 69 | MASK | A2 | STRING |
| 70 | BOTTOMIP | A3 | STRING |
| 71 | TOPIP | A4 | STRING |
| 72 | ADDRESS | A1 | STRING |
| 73 | RESPONSE | A2 | STRING |

FIG. 14

MAPPING TABLE

| ELEMENT ATTRIBUTES | | | |
|---|---|---|---|
| ELEMENTID | ATTRID | COLLECTORID | REFRESH |
| 2 | 49 | | |
| 2 | 50 | 214 | |
| 3 | 51 | | |
| 3 | 52 | | |
| 4 | 51 | 201 | |
| 4 | 52 | 202 | |
| 5 | 53 | | |
| 5 | 54 | | |
| 6 | 55 | | |
| 6 | 56 | | |
| 7 | 57 | | |
| 7 | 58 | | |
| 7 | 59 | | |
| 7 | 60 | | |
| 8 | 61 | | |
| 9 | 62 | 203 | |
| 9 | 63 | 204 | |
| 9 | 64 | | |
| 9 | 65 | 205 | |
| 10 | 53 | | |
| 10 | 54 | | |
| 10 | 66 | | |
| 11 | 53 | | |
| 11 | 54 | | |
| 11 | 67 | | |
| → 101 | 68 | (208) | |
| → 101 | 69 | (209) | |
| → 101 | 70 | (210) | |
| → 101 | 71 | (211) | |
| 102 | 72 | 212 | |
| 102 | 73 | 213 | |
| 103 | 49 | 200 | |
| 103 | 50 | | |
| 104 | 62 | | |
| 104 | 63 | | |
| 104 | 64 | 215 | |
| 104 | 65 | | |
| 105 | 51 | | |
| 105 | 52 | | |
| 106 | 55 | | |
| 106 | 56 | | |
| 107 | 57 | | |

FIG. 15A

| | | | |
|---|---|---|---|
| 107 | 58 | | |
| 107 | 59 | | |
| 107 | 60 | | |

| FINGERPRINTS | | |
|---|---|---|
| ELEMENTID | SEQ | RULE | TRUEWEIGHT | FALSEWEIGHT |
| 101 | 1 | NET.ISVALIDNET($THIS.NETWORK)=TRUE | 100 | 0 |
| 101 | 2 | NET.ISVALIDMASK($THIS.MASK)=TRUE | 100 | 0 |
| 102 | 1 | $RESPONSE != "NO REPLY" | 100 | 0 |
| 103 | 1 | $OS.TYPE = "SUN SOLARIS 2.7" | 100 | 0 |
| 104 | 1 | HTTP.RESPONSE != "" | 100 | 0 |

FIG. 18

| COLLECTORS | | | |
|---|---|---|---|
| ID | SEQ | METHOD | STATEMENT |
| 200 | 1 | QUESO | $ADDRESS 22 |
| 201 | 1 | DEFAULT | ROOT |
| 202 | 1 | EMAIL | TO: ROOT@$ADDRESS |
| 202 | 2 | EMAIL | SUBJECT: ROOT USER PASSWORD |
| 203 | 1 | DEFAULT | 80 |
| 204 | 1 | HTTP | PORT $THIS.PORT |
| 204 | 2 | HTTP | GET / HTTP 1.1 |
| 205 | 1 | EXPR | $HTTPD.LENGTH |
| 206 | 1 | SSH | IS -I $THIS.NAME | AWK... |
| 207 | 1 | SMB | DIR $THIS.NAME... |
| 208 | 1 | CONFIG | TEXTBOX |
| 209 | 1 | CONFIG | TEXTBOX(255.255.255.0) |
| 210 | 1 | EXPR | NET.GETBOTTOMIP($THIS.NETWORK, $THIS.MASK) |
| 211 | 1 | EXPR | NET.GETTOPIP($THIS.NETWORK, $THIS.MASK) |
| 212 | 1 | DISCOVERY | |
| 213 | 1 | PING | PING $THIS.ADDRESS | AWK... |
| 214 | 1 | DNS | LOOKUP $ADDRESS |
| 215 | 1 | SSH | PS -AEF | AWK HTTPD... |
| 216 | 1 | SSH | VMSTAT | GREP... |
| 217 | 1 | SSH | SAR... |

FIG. 16

| CHILDREN | |
|---|---|
| ELEMENTID | CHILDELEMENTID |
| 0 | 1 |
| 1 | 2 |
| 1 | 3 |
| 1 | 4 |
| 1 | 5 |
| 1 | 6 |
| 1 | 7 |
| 1 | 8 |
| 1 | 9 |
| 5 | 10 |
| 5 | 11 |
| 0 | 100 |
| 100 | 101 |
| 101 | 102 |
| 102 | 103 |
| 103 | 104 |
| 103 | 105 |
| 103 | 106 |
| 103 | 107 |
| 103 | 108 |
| 0 | 1000 |
| 1000 | 1001 |
| 1001 | 1002 |
| 1002 | 1003 |
| 1003 | 1004 |
| 1003 | 1005 |
| 1003 | 1006 |
| 1003 | 1007 |

| DATA | | | | | |
| --- | --- | --- | --- | --- | --- |
| ELEMENTID | TIMESTAMP | ATTR1 | ATTR2 | ATTR3 | ATTR4 |
| 1001 | 40 | 1.1.1.0 | 255.255.255.0 | | |
| 1001 | 50 | 1.1.1.0 | 255.255.255.0 | 1.1.1.2 | 1.1.1.254 |
| 1002 | 50 | 1.1.1.20 | 25MS | | |
| 1003 | 60 | SOLARIS 2.7 | SUN01 | | |
| 1004 | 80 | 80 | <HTML... | | |
| 1005 | 90 | ROOT | ######## | | |
| 1006 | 100 | 512 | 55 | | |
| 1007 | 110 | SPARC01 | SPARC | 880 | 75 |
| 1007 | 110 | SPARC02 | SPARC | 950 | 45 |
| 1004 | 100 | 80 | <HTML... | APACHE 1.3 | 10 |

FIG. 19

METHOD AND/OR SYSTEM FOR IDENTIFYING INFORMATION APPLIANCES

CROSS-REFERENCE TO RELATED APPLICATIONS

This application claims priority from provisional patent application 60/603,501, Filed Aug. 20, 2004, which is incorporated herein by reference. This application is related to patent application Ser. No. 10/125,952, filed 18 Apr. 2002 and incorporated herein by reference.

COPYRIGHT NOTICE

Pursuant to 37 C.F.R. 1.71(e), Applicants note that a portion of this disclosure contains material that is subject to copyright protection (such as, but not limited to, source code listings, screen shots, user interfaces, or user instructions, or any other aspects of this submission for which copyright protection is or may be available in any jurisdiction.). The copyright owner has no objection to the facsimile reproduction by anyone of the patent document or patent disclosure, as it appears in the Patent and Trademark Office patent file or records, but otherwise reserves all copyright rights whatsoever.

FIELD OF INVENTION

The present system relates to a system and/or method of handling and/or managing resources in a data communication environment, such as data devices and/or information appliances communicating on a digital network. More specifically, the system described herein relates to a data method and/or system allowing identification of resources over a network that can repeatedly identify particular resources (e.g., information appliances or parts thereof, networks or parts thereof, or other resources that communicate using a network), even when various aspects of such resources may change over time.

BACKGROUND OF INVENTION

Large organizations generally have a need to have up-to-date information regarding information equipment and other resources that exist within the organization. For example, it may be necessary or useful to know which programs are installed on particular information appliances, which optional or accessory components are installed, which programs are actually in execution at any particular time, etc. In addition, other data, such as financial information is needed to understand characteristics such as costs being incurred by the organization by virtue of the existence and use of various resources. In various organizations, there may be interest in knowing costs to run a particular type of information appliance (e.g., a server) and/or an individual appliance.

Earlier tools exist that allow automatic detection of the type of operating system which exists on a computer at a particular network address, but these generally cannot detect the type of computer on which the operating system is running, the CPU speed, the chip set in use, the mounted file system, the files thereof that are accessible, or the application programs that are installed and in particular these systems typically lack the ability to reliably and repeatedly detect an individual system or other elements in an information system network, particularly when various aspects of such systems change over time.

Some earlier desktop signature systems create identification data (such as a signature) from software running on the system itself (rather than, for example, over a network) and do not have always the ability to positively identify the same system across hardware and software configuration changes. The purpose of these systems is often to restrict operating system software from running on any system that does not have the exact profile of the system where the operating system was installed.

SUMMARY OF INVENTION

General Characteristics and Advantages

The present system in specific embodiments is involved with and enables methods and/or systems for identifying individual information appliances or devices in an institutional environment using a communication system. In particular embodiments, the system described herein is involved with and enables methods and/or systems for representing and/or managing and/or querying data in an information system that allows a data entity (herein, at times, referred to as a "signature" for an individual system or at other times referred to as a "data element") to be developed for a system and further uses that data entity in other management and/or inventory functions.

According to specific embodiments of the system described herein, a data entity used as a signature can be understood as having two important properties: 1) uniqueness (or variance), e.g., the data elements or signatures of two distinct resources cannot generate a match. In other words, there should be sufficient variance between the data that makes up the signatures over all resources that will be analyzed and 2) persistence or stability, e.g., data elements or signatures extracted from the same information appliance at different times or different circumstances will match, even if the information appliance is upgraded or altered somewhat over time.

In selecting data to use as a signature, it is also desirable that different components of the signature data element have "independence," where independence means that the components of the data entity (or signature) should contain un-correlated information. In other words, the data entity should not have any internal redundancy. For example, a signature that consists of the hard-drive id and the network card id meets the independence requirement reasonably well, because the two ids are usually not correlated: an upgrade to a hard-drive does not necessarily imply a different network card. However, CPU speed and CPU id, for example, are not independent, because upgrading the CPU will most likely change the CPU id and the speed.

In further embodiments, the system described herein is involved with and enables methods and/or systems for identifying an information system when one or more components are added and/or swapped from that system.

Thus various methods for data representation, data handling, data querying, data creating, and data reporting can be employed in specific embodiments. The system described herein can also be embodied as a computer system and/or program able to provide one or more data handling functions as described herein and/or can optionally be integrated with other components for capturing and/or preparing and/or displaying data such as bar code scanning systems, wireless inventory and/or tracking systems, network management systems, etc.

Various embodiments of the system described herein provide methods and/or systems that can be implemented on a general purpose or special purpose information handling system using a suitable programming language such as Java, C++, Cobol, C, Pascal, Fortran, PL1, LISP, assembly, SQL, etc., and any suitable data or formatting specifications, such as HTML, XML, dHTML, tab-delimited text, binary, etc. In the interest of clarity, not all features of an actual implementation are described in this specification. It will be understood that in the development of any such actual implementation (as in any software development project), numerous implementation-specific decisions must be made to achieve the developers' specific goals and subgoals, such as compliance with system-related and/or business-related constraints, which will vary from one implementation to another. Moreover, it will be appreciated that such a development effort might be complex and time-consuming, but would nevertheless be a routine undertaking of software engineering for those of ordinary skill having the benefit of this disclosure.

The system described herein and various specific aspects and embodiments will be better understood with reference to the following drawings and detailed descriptions. For purposes of clarity, this discussion refers to devices, methods, and concepts in terms of specific examples. However, the system described herein and aspects thereof may have applications to a variety of types of devices and systems.

Furthermore, it is well known in the art that logic systems and methods such as described herein can include a variety of different components and different functions in a modular fashion. Different embodiments of the system described herein can include different mixtures of elements and functions and may group various functions as parts of various elements. For purposes of clarity, the system described herein is described in terms of systems that include many different innovative components and innovative combinations of innovative components and known components. No inference should be taken to limit the system described herein to combinations containing all of the innovative components listed in any illustrative embodiment in this specification.

When used herein, "the system described herein" should be understood to indicate one or more specific embodiments described herein. Many variations according to the system described herein will be understood from the teachings herein to those of skill in the art.

BRIEF DESCRIPTION OF DRAWINGS

FIG. 4 illustrates an example source code listing showing example matching rules according to specific embodiments of the system described herein.

FIGS. 5A-C illustrate example source code listings showing a source code listing showing an example match rule firing logic module according to specific embodiments of the system described herein.

FIG. 6 is a table illustrating an example attribute set and example values according to specific embodiments of the system described herein.

FIG. 7 is a table illustrating an example of using different attribute sets for different operating systems according to specific embodiments of the system described herein.

FIG. 8 is a table illustrating four example matching rules according to specific embodiments of the system described herein.

FIG. 13 is an element table that give element names and Ids and pointers to collector programs.

FIG. 14 is a table of attribute names and Ids.

FIGS. 15A and 15B are a mapping table between element Ids, attribute IDs and collector IDs.

FIG. 16 is a table mapping element Ids to child element Ids.

FIG. 17 is a fingerprints table that maps element Ids to fingerprint rules.

FIG. 18 is a collectors table that maps collector IDs to the corresponding collection instructions for each attribute mapped to the element and fingerprint currently being processed.

FIG. 19 is an example of a data table that stores collected attribute data.

DETAILED DESCRIPTION OF PREFERRED EMBODIMENT

Overview

Figure 1:
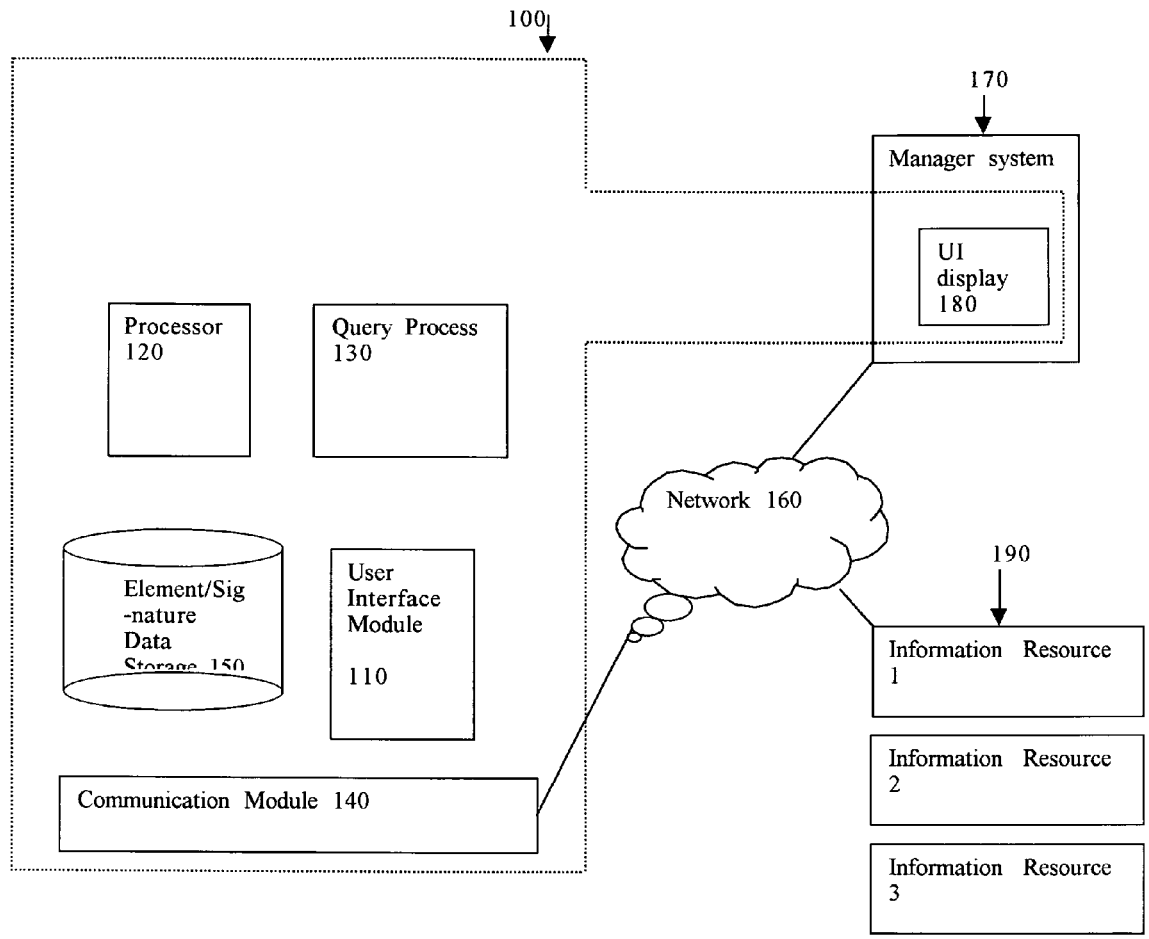
FIG. 1 illustrates a block diagram of a preferred embodiment of the current system described herein in a network environment.

Patent application Ser. No. 10/125,952, filed 18 Apr. 2002 and incorporated herein by reference, discusses systems and methods allowing for the gathering, storing, and managing of various assets in an organization or enterprise. An example inventory system discussed in that application used a communication media, such as an email system and/or computer network, to automatically gather information about assets of an organization and perform various management and inventory functions regarding those assets.

Example systems discussed therein used a data repository structure having elements and attributes, as well as fingerprint modules, collection rules, and other components, to automate much of the data collection of assets within the system.

The present system described herein is related to systems and/or methods that allow a computerized inventory system to identify individual resources (such as computer systems, networks, other information enabled devices, etc.) in a automatic inventory discovery system and keep track of or maintain the identity of those individual items as various characteristics of the assets change over time. The system described herein can be embodied as part of a system such as that described in 10/125,952 or in other types of computerized inventory systems. More details of a computerized inventory discovery system from U.S. patent application Ser. No. 10/125,952 are presented in FIG. 10 and following herein and accompanying text. This information is taken directly from U.S. Pat. No. 6,988,134 into which U.S. patent application Ser. No. 10/125,952 matured.

In specific embodiments, the system described herein can be understood as involving deployment of one or more matching rules in a computerized inventory system. Matching rules provide a powerful way to relate characteristics of external resources to data elements and attributes or signatures stored in an inventory information repository. Matching rules can be simple in some embodiments and/or in some situations, but may be complex and nested according to specific embodiments and as various situations and/or applications require.

In alternative embodiments, the system described herein can be understood as involving development of signatures for external resources and storing those signatures in a data store. Signatures, according to specific embodiments of the system described herein, are multiple part and capable of partially matching to external elements and furthermore capable of being updated to represent newly available external data or modified external characteristics.

In order to provide an easier description, the system described herein will at times herein be described in the context of a system such as one or more of those described in patent application Ser. No. 10/125,952. The system described herein is not limited to such systems, however, and can be used in other types of inventory applications. Furthermore, the terminology used in that application should not be used to limit terms as used herein.

For ease of understanding this discussion, the following discussion of terms is provided to further describe terms used herein. These descriptions should not be taken as limiting.

A data element or element for purposes of this description can be understood as a data object within an inventory data repository. In some situations, an element can be generally understood to represent an external asset. One or more attributes having assignable values can be associated with a data element. An element once created or instantiated or added to a data repository system generally persists in the system until it is explicitly removed or possibly joined to another element. An element generally has a unique element_id within the data repository system, and this element_id is independent of any external asset to which the element relates. An element can have various relationships to other elements, for example as parent, child, sibling.

As an example, an individual computer system might have an element structure as follows:

| Attribute Name | Attribute Value |
|---|---|
| Element_Name: | ComputerA |
| IP_ADDR_1: | 10.1.1.1 |
| NIC_MAC_ADDR: | 00:E0:81:24:B7:1C |
| HD_serial_number: | SK434xzh |
| OS_serial_number: | 83084dd3 |

A signature as used for purposes of this description can be understood as a data entity (such as a data element as just described) and/or data method for uniquely and repeatably identifying a particular asset (such as a single computer server system) even after some modification of the asset or change of circumstances. According to specific embodiments of the system described herein, particular types of data elements can be used as signatures. In other embodiments, signatures can be implemented in other ways, such as using hashing functions or combined values, etc.

Attributes and their attribute values are important subparts of data elements. The particular attributes defined for a data element may be determined by a detected nature of that data element, such as the operating system and may change over time as different types of information are collected or become available for a particular external resource.

OPERATION EXAMPLES

FIG. 1 illustrates a block diagram of a preferred embodiment of the current system described herein in a network environment. According to specific embodiments of the system described herein, there exists an information processing logic execution environment, such as system 100, having processor 120, scan/query process 130, a data storage 150, a user interface module 110, communications module 140, and optionally a management console 180. In such an environment, scan/query process 130 is able to scan or probe for possible resources 190 over a network 160. This configuration represents just one possible simple logic execution and network environment, and many others are suitable, as will be understood to those of skill in the art.

Figure 10:
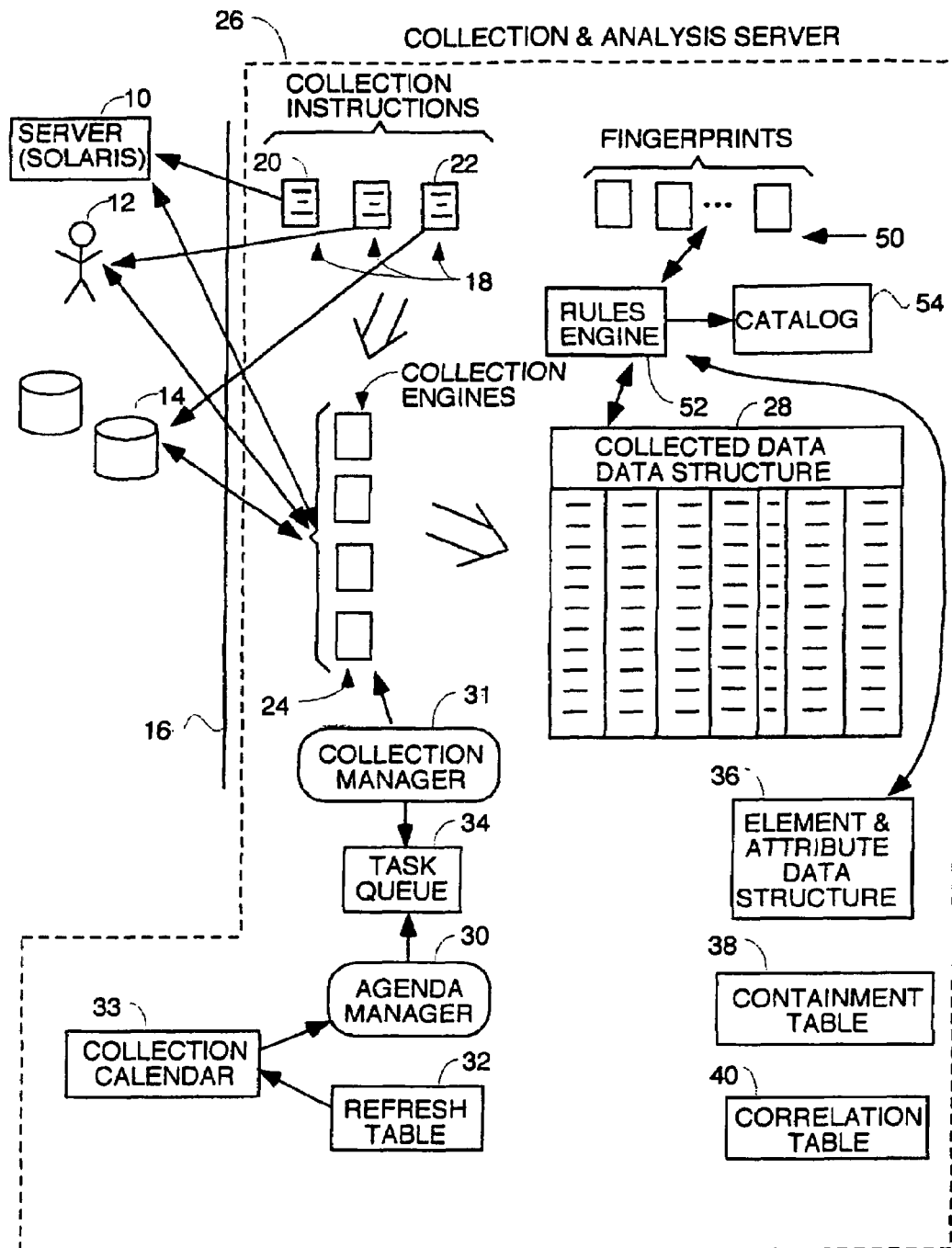
FIG. 10 is a block diagram illustrating the environment in which the works and some of the key elements of a system within the teachings of the system described herein.

According to specific embodiments of the system described herein, there is a network inventory system using fingerprints with collection instructions and one or more matching rules, as described in FIG. 10 and the accompanying text herein. Matching rules allow a collected data set to be compared against one or more stored data elements in order repeatably to detect a particular external resource.

The following straightforward example illustrates how matching rules according to specific embodiments of the system described herein eliminates double counting of machines.

Example #1

Comparing Scan Results to Stored Data

In a first example, consider a situation of a local area network for which it is desired to build a data representation of all available devices using an automatic detection and/or inventory system. According to specific embodiments of the system described herein, an inventory system includes a data repository with an interface (for example, a data repository such as described in patent application Ser. No. 10/429,270 filed 2 May 2003), an ability to scan the network to detect responding addresses and make certain queries of devices found at those addresses, and one or more matching rules. In this example, a simple matching rule is that a detected external resource matches a stored element if at least two out of the following three conditions are met:

a. the MAC address of the primary network card detected for the resource is identical to a corresponding attribute value for the stored element;

b. the serial number of the main disk drive detected for the resource is identical to a corresponding attribute value for the stored element;

c. the serial number reported by the operating system of the resource is identical to a corresponding attribute value for the stored element.

In this particular example, this matching rule can be considered to allow for a partial match. In specific embodiments, the system may keep track of whether a matching rule results in a partial match or a complete match. In other embodiments, a matching rule may just detect and flag a match and not keep track of whether it is partial or complete.

Matching rules according to specific embodiments of the system described herein can be simple or complex and development of various matching rules is within the skill of practitioners in the art. In some embodiments, matching rules can include different weights given to different components, so that a match is always found if two highly weighted attributes match, for example, but is not found if only two lesser weighted attributes match.

In further embodiments, matching rules and associated rules can perform additional processing when it is determined that an attribute of a signature data element has changed. For example, if a network card with a particular address that was previously identified in a particular server is not detected on a future scan, the system can search current scan records to determine if that network card has been moved to or identified with another server. This can be used by the system described herein as an indication that there could be two servers with nearly the same signature that could be getting confused, or possibly one server that is being counted twice, and would therefore require further investigation. If the network card is seen to disappear on a given asset and is replaced by a new card and does not show up anywhere else in the infrastructure, at some point after one or more scans the system described herein may determine that it has been replaced and delete it from the data representation of the assets.

With a logical matching routine present, an inventory system according to specific embodiments scans or otherwise determines the active addresses in the particular network or domain of interest. Various methods and/or techniques for scanning, for example, all active network addresses are known in the art and may be used according to specific embodiments of the invention. In this case, for example, scan results might detect active addresses 10.1.1.1 and 10.1.13.25 and further queries would determine the information as indicated in Table 1.

TABLE 1

SCAN RESULTS

| IP ADDRESS | 10.1.1.1 | 10.5.13.25 |
|---|---|---|
| network card MAC address | 00:E0:81:24:B7:1C | 00:80:AB:29:C3:78 |
| disk driver serial number | SK434xzh | MD40009234 |
| OS serial number | 83084dd3 | f974df56 |

TABLE 2

KNOWN DEVICES

| IP ADDRESS | 10.1.1.1: |
|---|---|
| network card MAC address | 00:E0:81:24:B7:1C |
| disk driver serial number | SK434xzh |
| OS serial number | 83084dd3 |

With this information, an inventory system according to specific embodiments of the system described herein then compares each responding network address with every "known" device (e.g., a known device system in specific embodiments can be defined as every device for which an element is created and stored and retrievable from a data repository, for example as shown in Table 2) and uses the example matching rule provided above. In this case, the comparison might proceed as follows:

(1) Compare IP address value "10.1.1.1" against known devices (in this simple example, one at this point). In this case, using the matching rule above, indicates that 10.1.1.1 matches the existing element and the matching process proceeds to the next scanned device.

(2) Compare 10.5.13.25 against all known device elements using the matching rule. Since there is no match, the system described herein creates a new device data element and set the data element's attribute values to the information learned from the scan (e.g., the MAC address and serial numbers) to those collected from address 10.5.23.25.

Example #2

Identifying a Device that has Changed Over Time

In a further example, consider network scan data on a particular date (e.g., January 1 of the year) with the following response:
from IP address 10.1.1.1:
network card MAC address="00:E0:81:24:B7:1C"
disk driver serial number="SK434xzh"
OS serial number="83084dd3"

If there are other device elements stored, the system described herein then examines them using a matching rule such as the example described and if there is no match (for example because this is the first device), the system described herein creates a new device element and sets the device element's attribute values (i.e., the MAC address and serial numbers) to those from 10.1.1.1.

On January 5, the network card of 10.1.1.1 is replaced with a faster network card. The new network card has the MAC address "00:E0:81:24:FF:EE". On January 10, a network scan using the data repository built from the January 1 proceeds as follows:

(1) if necessary, load device identification method(s) (e.g., fingerprints described in related patent applications)

(2) detect a live IP address at 10.1.1.1.

(3) determine that IP address 10.1.1.1 runs HP-UX (for example using a fingerprint system as described in above referenced patent applications)

(4) attempt to collect attribute information from each system, such as network card MAC address, disk drive serial number, and operating system serial number.

For example, from 10.1.1.1:
network card MAC address="00:E0:81:24:FF:EE" (different from previous scan)
disk driver serial number="SK434xzh"
OS serial number="83084dd3"

(5) Examine known device data elements and determine if currently collected data matches an existing device data using the example matching rule described above;

(6) Compare 10.1.1.1 against the data element/signature created from the January 1 scan. With an appropriate matching rule, match on two out of the three attributes (disk drive serial number and OS serial number) and thus conclude that the newly collected data is from the same external device.

(7) Update the stored attributes with the latest values collected from 10.1.1.1. the device's network card MAC address attribute is set to "00:E0:81:24:FF:EE".

As a further example, on January 15, the hard drive on 10.1.1.1 is replaced or updated, causing a new hard driver serial number "GX152248". On January 20, another network scan collects attribute data from 10.1.1.1 and a matching rule determines that the element should again be updated.

Using Elements as Signatures

In further embodiments, the system can be understood as a mechanism for using data elements records, with their associated attributes, as signatures to identify particular devices. As with the description above, matching rules as those described can be used to determine with signatures that include some variation in fact match the same device or are related to different devices.

Figure 2:
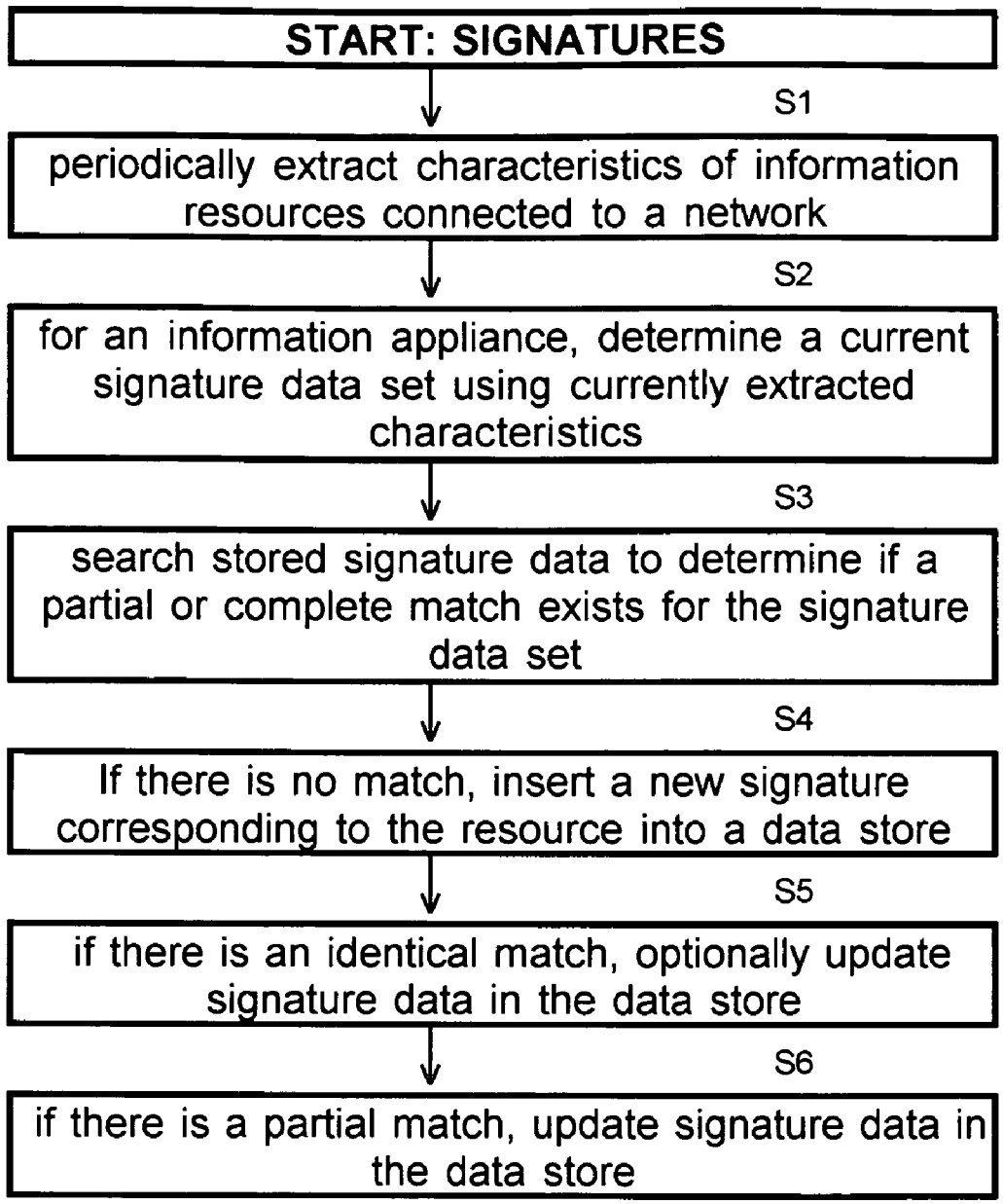
FIG. 2 is a flow chart illustrating steps of creating a signature according to specific embodiments of the system described herein.
Figure 3:
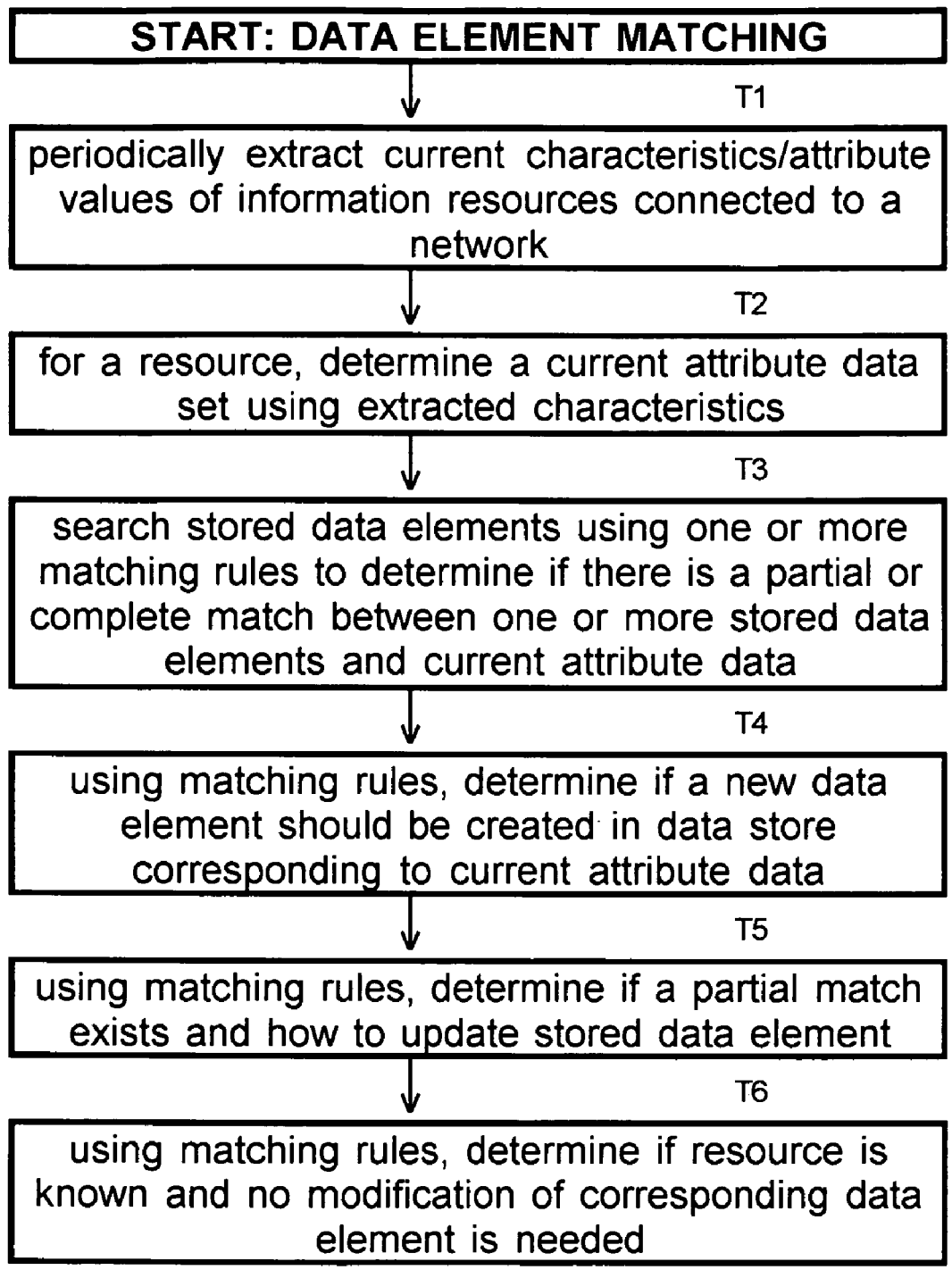
FIG. 3 is a flow chart illustrating steps of using matching rules to compare data elements according to specific embodiments of the system described herein.

Thus, according to specific embodiments, the present system can also be understood as involving a method that can be executed on a computer system. Methods according to the system described herein can be characterized in terms of data elements and/or signature analysis. Thus, FIG. 2 is a flow chart illustrating steps of creating a signature according to specific embodiments of the system described herein. Alternatively, FIG. 3 is a flow chart illustrating steps of using matching rules to compare data elements according to specific embodiments of the system described herein.

Using Other Values as Signatures

As a further example, a number of other values can be used as signature data sets according to specific embodiments of the invention. For example, in networked environments, it might be the case that one or more types of network requests typically generates a response packet having particular values. In such cases, the response packets can either be stored as signature data or can be combined or hashed into more standardized values.

In such a case, a signature can be developed and stored as either a group or a sequence of numerical data. For example, a signature might be composed of ten order four-byte numbers, one representing an IP address for a system, one representing a hash value derived from an operating system serial number of a system, one representing a reported hard disk serial number, etc. In this case, as with above, partial matches may be allowed on some subset of the signature data, and the stored signature updated with new data. This type of updateable hashed value signature may be used instead of or in conjunction with a multipart data element as described above in specific embodiments.

Thus, as an example, the attribute data shown in the table below can be transformed and stored into a signature data value as follows.

| IP ADDRESS | 10.1.1.1 | SD1: 10.1.1.1 |
|---|---|---|
| network card MAC address | 00:E0:81:24:B7:1C | SD2: 0.224.129.36 |
| | | SD3: 183.28.0.0 |
| disk driver serial number | SK434xzh | SD4: 198.234.17.65 |
| OS serial number | 83084dd3 | SD5: 139.44.68.15 |

In this example, various data collected from a resource has been converted into five, 32 bit signature date words. This conversion can be by a variety of means, including various conversion and/or hash functions, as will be understood in the art.

Source Code Examples

To provide further illustrations of specific example implementations, FIG. 4 illustrates an example source code listing showing example matching rules according to specific embodiments of the system described herein. In this example, a match rule includes code for creating a new device element if no match is found and also includes code for updating a device element when new attribute data is available.

FIGS. 5A-C illustrate example source code listings showing a source code listing showing an example match rule firing logic module according to specific embodiments of the system described herein. In this example, a set of different matching rules are compared against collected data until a match, partial match, no match, or error conclusion is reached. According to this specific example, collected source element attributes are matched against one or more stored data elements until an exact or partial match is found. If neither is found, a new element is created as discussed above. Partial matches can result in updating attribute data as discussed above.

FIG. 6 is a table illustrating an example attribute set and example values according to specific embodiments of the system described herein. In this example, attributes are selected from various hardware serial numbers, as well as network addresses, reboot time stamps, OS characteristics, etc. This table is provided as an example only, and different attributes can be use in different embodiments. For example, FIG. 7 is a table illustrating an example of using different attribute sets for different operating systems according to specific embodiments of the system described herein.

FIG. 8 is a table illustrating four example matching rules according to specific embodiments of the system described herein. This table provides summaries of the matching rules. In these examples, each matching rule specifies which attributes are considered, how many attributes must be available to attempt to determine a match and how many attributes must match. More complex matching rules, as described herein can also be employed in specific embodiments. Note as indicated in this example, according to specific embodiments of the invention, there can be as many matching rules as required for a given type of resource. For example, for personal computers, there can be separate matching rules for each type of operating system, based on the data likely to be available for that operating system and the uniqueness, persistence, and independence of that data.

Embodiments in a Programmed Information Appliance

Figure 9:
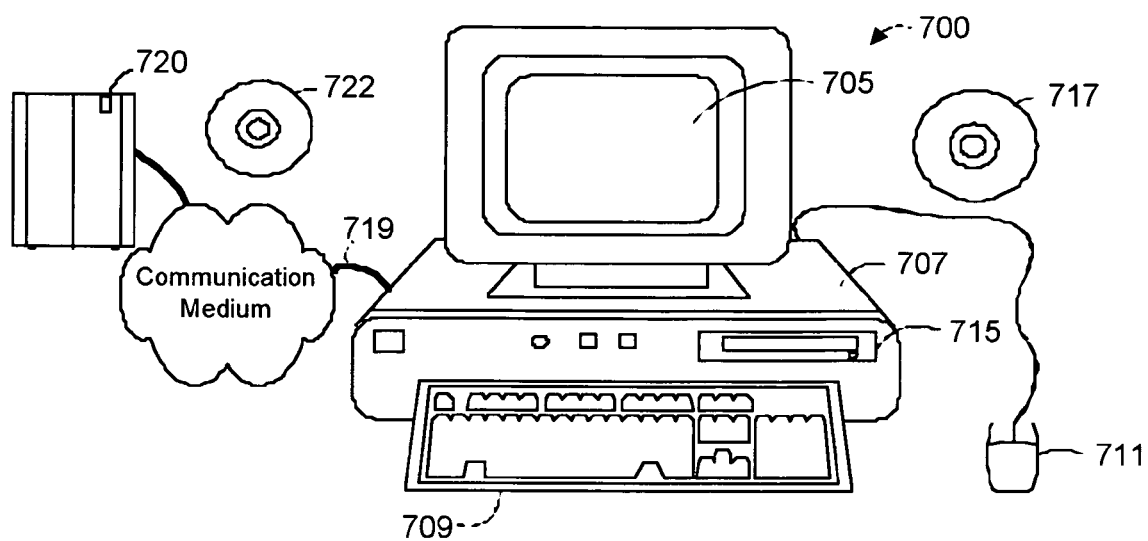
FIG. 9 is a block diagram showing a representative example logic device in which various aspects of the present system described herein.

FIG. 9 is a block diagram showing a representative example logic device in which various aspects of the present system described herein. As will be understood to practitioners in the art from the teachings provided herein, the system described herein can be implemented in hardware and/or software. In some embodiments of the system described herein, different aspects of the system described herein can be implemented in either client-side logic or server-side logic. As will be understood in the art, the system described herein or components thereof may be embodied in a fixed media program component containing logic instructions and/or data that when loaded into an appropriately configured computing device cause that device to perform according to the invention. As will be understood in the art, a fixed media containing logic instructions may be delivered to a user on a fixed media for physically loading into a users computer or a fixed media containing logic instructions may reside on a remote server that a user accesses through a communication medium in order to download a program component.

FIG. 9 shows an information appliance (or digital device) 700 that may be understood as a logical apparatus that can read instructions from media 717 and/or network port 719, which can optionally be connected to server 720 having fixed media 722. Apparatus 700 can thereafter use those instructions to direct server or client logic, as understood in the art, to embody aspects of the system described herein. One type of logical apparatus that may embody the system described herein in a computer system as illustrated in 700, containing CPU 707, optional input devices 709 and 711, disk drives 715 and optional monitor 705. Fixed media 717, or fixed media 722 over port 719, may be used to program such a system and may represent a disk-type optical or magnetic media, magnetic tape, solid state dynamic or static memory, etc. In specific embodiments, the system described herein may be embodied in whole or in part as software recorded on this fixed media. Communication port 719 may also be used to initially receive instructions that are used to program such a system and may represent any type of communication connection.

The system described herein also may be embodied in whole or in part within the circuitry of an application specific integrated circuit (ASIC) or a programmable logic device (PLD). In such a case, the system described herein may be embodied in a computer understandable descriptor language, which may be used to create an ASIC, or PLD that operates as herein described.

Example Automated Inventory Discovery System Using Fingerprints, Collection Instructions and Matching Rules The following material details aspects of the automated inventory discovery system described in U.S. patent application Ser. No. 10/125,952 filed 18 Apr. 2002 which has been incorporated by reference.

The data store and the automated inventory discovery data collection system will have three characteristics that allow the overall system to scale well among the plethora of disparate data sources.

The first of these characteristics that all species within the genus will share is a common way to describe all information as element/attributes structures. Specifically, the generic way to describe all information creates a different element/attribute data structure for each different type of information, e.g., server, software application program, software license. Each element in an element/attribute data structure contains a definition of the data type and length of a field to be filled in with the name of the asset to which the element corresponds. Each element/attribute data structure has one or more definitions of attributes peculiar to that type element (an element is an asset). These definitions include the semantics for what the attribute is and the type and length of data that can fill in the attribute field. For example, a server element will have attributes such as the CPU server type, CPU speed, memory size, files present in the mounted file system, file system mounted, etc. The definitions of each of these attributes includes a definition of what the attribute means about the element (the semantics) and rules regarding what type of data (floating point, integer, string, etc.) that can fill in the attribute field and how long the field is. Thus, all attribute instances of the same type of a particular element that require floating point numbers for their expression will be stored in a common floating point format so programs using that attribute instance data can be simpler in not having to deal with variations in expression of the data of the same attribute. In some embodiments, all attribute data that needs to be expressed as a floating point number is expressed in the same format. The automated inventory discovery system does not force all data sources to conform to it. Whatever format the data source provides the attribute data in, that data will be post processed to conform its expression in the collected data store to the definition for that attribute in the element/attribute data structure in terms of data type, data field length and units of measure.

A license type element will have attributes such as the license term in years or months, whether the license is worldwide or for a lesser territory, price, etc.

The second characteristic that all species within the genus will share is provision of a generic way to retrieve attribute data regardless of the element and the type of attribute to be received. This is done by including in each attribute definition in an element/attribute data structure a pointer to one or more "collection instructions". In some embodiments, the collection instruction for each attribute type is included in the attribute definition itself. These "collection instructions" detail how to collect an instance of that particular attribute from a particular data source such as a particular server type, a particular operating system, a particular individual (some collection instructions specify sending e-mail messages to particular individuals requesting a reply including specified information). More specifically, each attribute of each element, regardless of whether the element is a server, a lease, a maintenance agreement, etc., has a set of collection instructions. These collection instructions control data collectors to carry out whatever steps are necessary to collect an attribute of that type from whatever data source needs to be contacted to collect the data. The collection instructions also may access a collection adapter which is a code library used by the collector to access data using a specific access protocol.

The definition of each attribute in the element/attributes data structure may include a pointer to a "collection instruction". The collection instruction is a detailed list of instructions that is specific to the data source and access protocol from which the attribute data is to be received and defines the sequence of steps and protocols that must be taken to retrieve the data of this particular attribute. Each time this "collection instruction" is executed, an instance of that attribute will be retrieved and stored in the collection data store. This instance will be post-processed to put the data into the predefined format for this attribute and stored in the collected data structure in a common data store at a location therein which is designated to store instance of this particular attribute.

As an example of a collection instruction, suppose CPU speed on a UNIX server element is the desired attribute to collect. For UNIX servers, there is a known instruction that can be given to a UNIX server to cause it to retrieve the CPU speed. Therefore the "collection instruction" to collect the CPU speed for a UNIX server type element will be a logical description or computer program that controls the collection gateway to, across a protocol described by the collection instructions, give the UNIX server the predetermined instructions or invoke the appropriate function call of an application programmatic interface provided by UNIX servers of this type to request the server to report its CPU speed. The reported CPU speed would be received from the collection gateway and stored in the collected data table.

Another example of a "collection instruction" on how to collect data for a particular type of attribute would be as follows. Suppose the attribute data needed was the name of the database administrator for an Oracle database. The "collection instruction" for collection of this attribute would be a program that controls the collection gateway to send an email message addressed to a particular person asking that person to send a reply email giving the name of the Oracle database administrator. The program would then scan returning emails for a reply from this person and extract the name of the database administrator from the email and put it in the collected data table. Typically, the email would have a fixed format known to the definition program such that the definition program would know exactly where in the email reply the Oracle database administrator's name would appear. A "collection instruction" to extract the maintenance costs attribute of a software license type element typically would be a definition or code that controls the data collector program to access a particular license file, read file looking for a particular field or alphanumeric string with a semantic definition indicating it was the maintenance cost and extract the maintenance cost and put that data into the data store.

The third characteristic that all species within the genus share is that information of all different types collected by the agent programs using the definitions is stored in a single common physical data store after post processing to conform the data of each attribute to the data type and field length in the attribute definition for that attribute of that element/attribute data structure. The element/attribute descriptions, containment or system-subsystem relationships between different element/attributes and collected data all are stored in one or more unique data structures in a common data store. By post processing to insure that all attribute data is conformed to the data type and field length in the element/attribute definition, correlations between data of different types is made possible since the format of data of each type is known and can be dealt with regardless of the source from which the data was collected. In other words, by using a generic element/attribute defined structure for every type element and attribute, all the data collected can be represented in a uniform way, and programs to do cross-correlations or mathematical combinations of data of different types or comparisons or side-by-side views or graphs between different data types can be more easily written without having to deal with the complexity of having to be able to handle data of many different types, field lengths but with the same semantics from different sources. These characteristics of the data structures allow data of different types selected by a user to be viewed and/or graphed or mathematically combined or manipulated in some user defined manner. This allows the relationships between the different data types over time to be observed for management analysis. In some embodiments, the user specifications as to how to combine or mathematically manipulate the data are checked to make sure they make sense. That is a user will not be allowed to divide a server name by a CPU speed since that makes no sense, but she would be allowed to divide a server utilization attribute expressed as an integer by a dollar cost for maintenance expressed as a floating point number.

The descriptions of the type and length of data fields defining the element/attribute relationships are stored, in the preferred embodiment, in three logical tables. One table stores the element descriptions, another table stores the descriptions of the type and length of each attribute data field, and a third table stores the mapping between each element and the attributes which define its identity in a "fingerprint". All complex systems have systems and subsystems within the system. These "containment" relationships are defined in another table data structure. Once all the attribute data is collected for all the elements using the "collection instructions" and data collector, the data for all element types is stored in a one or more "collected data" tables in the common data store after being post processed to make any conversions necessary to convert the collected data to the data type and length format specified in the attribute definition. These "collected data" tables have columns for each attribute type, each column accepting only attribute data instances of the correct data types and field lengths defined in the element/attribute definition data structure and having the proper semantics. In other words, column 1 of the collected data table may be defined as storage for numbers such as 5 digit integers representing CPU speed in units of megahertz for a particular server element reported back by the operating system of that server element, and column two might be assigned to store only strings such as the server's vendor name. Each row of the table will store a single attribute instance data value.

An attribute data instance stored in the collected data table is a sample of the attributes value at a particular point in time. In the preferred embodiment, each entry in the data table for an attribute has a timestamp on it. The timestamp indicates either when the attribute data was collected or at least the sequence in which the attribute data was collected relative to when attribute data for other elements or attribute data for this element was previously created. There is typically a refresh schedule in the preferred species which causes the value of some or all of the attributes to be collected at intervals specified in the refresh schedule. Each element can have its own refresh interval so that rapidly changing elements can have their attribute data collected more frequently than other elements. Thus, changes over time of the value of every attribute can be observed at a configurable interval.

In addition to the refresh interval, data collection follows collection calendars. One or more collection calendars can be used to control at which time, day, and date data collection is to take place. Data collection may also take place as the results of user activity.

In the preferred embodiment, this data store can be searched simultaneously and displayed in a view or graph defined by the user to observe relationships between the different pieces of data over time. This is done using a "correlation index" which is a specification established by the user as to which attribute data to retrieve from the collected data table and how to display it or graph it. The data selected from the collected data tables is typically stored in locations in a correlation table data structure at locations specified in the "correlation index".

This use of a common data store allows easy integration of all data into reports and provides easy access for purposes of cross referencing certain types of data against other types of data.

A "collection instruction" is a program, script, or list of instructions to be followed by an agent computer called a "data collector" to gather attribute data of a specific attribute for a specific element (asset) or gather attribute data associated with a group of element attributes. For example, if the type of an unknown operating system on a particular computer on the network is to be determined, the "collection instruction" will, in one embodiment, tell the collection gateway to send a particular type or types of network packets that has an undefined type of response packet. This will cause whatever operating system is installed to respond in its own unique way. Fingerprints for all the known or detectable operating systems can then be used to examine the response packet and determine which type of operating system is installed. Another example of a "collection instruction" is as follows. Once the operating system has been determined, it is known what type of queries to make to that operating system over which protocols to determine various things such as: what type of computer it is running on; what file system is mounted; how to determine which processes (computer programs in execution) are running; what chip set the computer uses; which network cards are installed; and which files are present in the file system. A "collection instruction" to find out, for example, which processes are actually in execution at a particular time would instruct the agent to send a message through the network to the operating system to invoke a particular function call of an application programmatic interface which the operating system provides to report back information of the type needed. That message will make the function call and pass the operating system any information it needs in conjunction with that function call. The operating system will respond with information detailing which processes are currently running as listed on its task list etc.

A "fingerprint" is a definition of the partial or complete identity of an asset by a list of the attributes that the asset can have. The list of attributes the asset will have is a "definition" and each attribute either contains a link to a "collection instruction" that controls a data collector to obtain that attribute data for that element or directly includes the "collection instruction" itself. Hereafter, the "definition" will be assumed to contain for each attribute a pointer to the "collection instruction" to gather that attribute data. For example, if a particular application program or suite of programs is installed on a computer such as the Oracle Business Intelligence suite of e-business applications, certain files will be present in the directory structure. The fingerprint for this version of the Oracle Business Intelligence suite of e-business applications will, in its included definition, indicate the names of these files and perhaps other information about them. The fingerprint's definition will be used to access the appropriate collection instructions and gather all the attribute data. That attribute data will then be post processed by a data collector process to format the collected data into the element/attribute format for each attribute of each element defined in data structure #1. Then the properly formatted data is stored in the collected data store defined by data structure #4 which is part of the common data store. Further processing is performed on the collected data to determine if the attributes of an element are present. If they are sufficiently present, then the computer will be determined to have the Oracle Business Intelligence suite of e-business applications element installed. In reality, this suite of applications would probably be broken up into multiple elements, each having a definition defining which files and/or other system information need to be present for that element to be present.

Fingerprints are used to collect all types of information about a company and identify which assets the company has from the collected information. In one sense, a fingerprint is a filter to look at a collected data set and determine which assets the company has from that data. Almost anything that leaves a mark on an organization can be "fingerprinted". Thus, a fingerprint may have attribute definitions that link to collection instructions that are designed to determine how many hours each day each employee in each different group within the company is working. These collection instructions would typically send e-mails to supervisors in each group or to the employees themselves asking them to send back reply e-mails reporting their workload.

A fingerprint must exist for every operating system, application program, type of computer, lease, license or other type of financial data or any other element that the system will be able to automatically recognize as present in the business organization.

One system within the genus of the system described herein will first collect all the information regarding computers, operating systems that are installed on all the networks of an entity and all the files that exist in the file systems of the operating systems and all the financial information. This information is gathered automatically using protocols, utilities, or API's available on a server executing the instructions of "definitions" on how to collect each type of data to be collected. The collected attribute data is stored in a data structure, and the attribute data is then compared to "fingerprints" which identify each type of asset by its attributes. A determination is then made based upon these comparisons as to which types of assets exist in the organization.

Another system within the genus will iteratively go through each fingerprint and determine which attributes (such as particular file names) have to be present for the asset of each fingerprint to be deemed to be present and then collect just that attribute data and compare it to the fingerprints to determine which assets are present. Specifically, the system will decompose each fingerprint to determine which attributes are defined by the fingerprint as being present if the element type corresponding to the fingerprint is present. Once the list of attributes that needs to be collected for each element type is known, the system will use the appropriate definitions for these attributes and go out and collect the data per the instructions in the definitions. The attribute data so collected will be stored in the data store and compared to the fingerprints. If sufficient attributes of a particular element type fingerprint are found to be present, then the system determines that the element type defined by that fingerprint is present and lists the asset in a catalog database.

Referring to FIG. 1, there is shown a block diagram illustrating the environment in which the invention works. FIG. 1 illustrates schematically the most important elements of a system which can automatically retrieve attribute data and determine from it the makeup or DNA of the organization. In other words, a system like that shown in FIG. 1 can automatically determine the number and type of computing hardware assets, installed software, key elements of information about the organization and extracted key information from the organization's leases, contracts, licenses, maintenance agreements, financial statements, etc. Essentially, all the important information that defines the makeup or "genes" of a business organization or government can be automatically gathered and assets automatically identified from their attributes. This information can be periodically re-gathered to present an up-to-date picture of the makeup of an organization to management at substantially all times.

The sources of data from which information is to be collected in this particular organization are server 10, person 12 and file system 14. All these sources of data are connected together by a data path such a local area network 16 (which can be fully or partially wireless) and suitable interface circuitry or, in the case of a human, a workstation including a network interface card and an e-mail application. None of this hardware and software is shown in detail in FIGS. 15A and 15B.

Everything to the right of line 16, representing the data path, represents processes, programs or data structures within a collection and analysis server 26. Typically this server is located at the customer premises, but, in some embodiments, it could be located remotely and make connections to the local area network of the customer via the internet or a dedicated WAN connection. Connections through the internet are more difficult to implement because businesses typically have firewalls and other security measures that must be dealt with before access to the internal LAN by a foreign computer will be granted.

A set of collection instructions, indicated generally at 18, are definitions and programs which serve to define what types of information can be gathered from each source and methods and protocols of doing so. For example, collection definition 20 may be for a server running a Solaris operating system and may define that one can get files, file systems mounted and processes currently in execution from such servers. Collection definition 22 for the file system 14 contains data indicating such things as the file system partitions, partition size, partition utilization, etc. can be gathered from the file system 14. The collection definitions then give specific step by step instructions to be followed by data collector processes, shown generally at 24. These collectors are processes in the collection server which can establish connections over existing protocols 16 to the various data sources under the guidance of the collection instructions 18. These processes actually collect the desired information needed by the system to identify which assets are present and extract information from people and documents that management desires to see. The collection instructions contain specific program instructions which control the collector processes 24 to traverse the network and communicate with the data source using the proper protocols and invoke predetermined function calls, read predetermined file or send predetermined e-mails addressed to specific people to extract the information needed.

The data collectors 24 can be any processes which are capable of running the program instructions of the collection instructions. The data collector processes must be capable of communicating with the data source devices, people or processes identified in the collection instructions using the necessary protocol(s). Those protocols include the various software layers and network communication hardware interface or gateway coupled to the collection and analysis server 26, the network protocols of whatever data path 16 the communication must traverse and the protocols to communicate with the appropriate process at the data source such as the operating system for server 10, the e-mail program of person 12 or the appropriate process in file system 14. Any collection process that can do this will suffice. In the preferred embodiment, the data collectors 24 are generic prior art "scrapers" which have been customized to teach them to speak the necessary protocols such as TCP/IP, SNMP, SSH, etc. which may be necessary to talk to the various data sources in the system.

Each data collection process 24 is identical in the preferred embodiment, and they are assigned to data collection tasks on availability basis. In the preferred embodiment, all the common processing is put into the data collectors such as libraries or adaptors for the different protocols the collector might have to use such as TCP/IP, IP only, UDP, Secure Sockets, SNMP, etc. This way, the collection instructions need not include all these protocols and can concentrate on doing the steps which are unique to gathering the specific data the collection instruction is designed to collect. In alternative embodiments, only the protocol libraries necessary to gather the particular data a collection instruction is designed to gather can be included in the collection instructions themselves. In other embodiments, the protocol libraries or adapters can be shared by all the data collector processes and just accessed as needed.

Typically, data collection requests are queued and as a data collector process, running locally or across the network, becomes available, it retrieves the next data collection request and the appropriate collection instruction for that request if it has support for the requested collection protocol. Then it executes the collection instructions therein to retrieve the requested data and store it in the appropriate location in a collected data storage structure 28. In alternative embodiments, a single collection process can be used that has a queue of collection requests and processes them one by one by retrieving the appropriate collection instruction for each request and executing the instructions therein.

Collected data structures 28 serve as the initial repository for the collected data obtained by the collectors. This is typically a table which has a column for storage of instances of each different attribute, with the rows in the column storing the value of that attribute at each of a plurality of different times. The intervals between the instances of the same attribute data vary from attribute to attribute, and are established by a refresh schedule in refresh table 32 in FIG. 10. Typically, all attributes are collected repeatedly on a "refresh schedule", subject to a collection calendar that drives at what time, day, and date collection shall take place. This allows analysis of how the value of an attribute changes over time.

An agenda manager process 30 consults the refresh schedule for each attribute in a refresh table 32 and also consults a collection calendar 33 to determine times and dates of collection of attributes. If this schedule data indicates it is time to collect an attribute, the agenda manager 30 puts a collection request in a task queue 34 for collection. A collection manager 31 periodically or continually scans the task queue 34 for tasks to be accomplished, and if a task is found, the collection manager 31 gets the task from the task queue 34 and retrieves the appropriate collection instruction for the requested attribute and executes its instructions using an available one of the collection engines 24. The collector then retrieves the data and stores it in the next available row of the column in collected data tables 28 that store instances of that attribute.

Each column in the collected data table is designed to receive only attribute data of the type and length and semantics defined for the attribute in an element/attribute data structure 30. In other words, each attribute has its instances stored in only one column of the collected data table, and the instance data must be in the format defined in the element/attribute data structure of FIG. 11. If the collected attribute data is not in the proper format, it is post processed to be in the proper format before it is stored in the collected data table. This makes it easier to write programs that deal with the collected data because the programmer knows that all instances of a particular attribute will have the same format.

Figure 11:
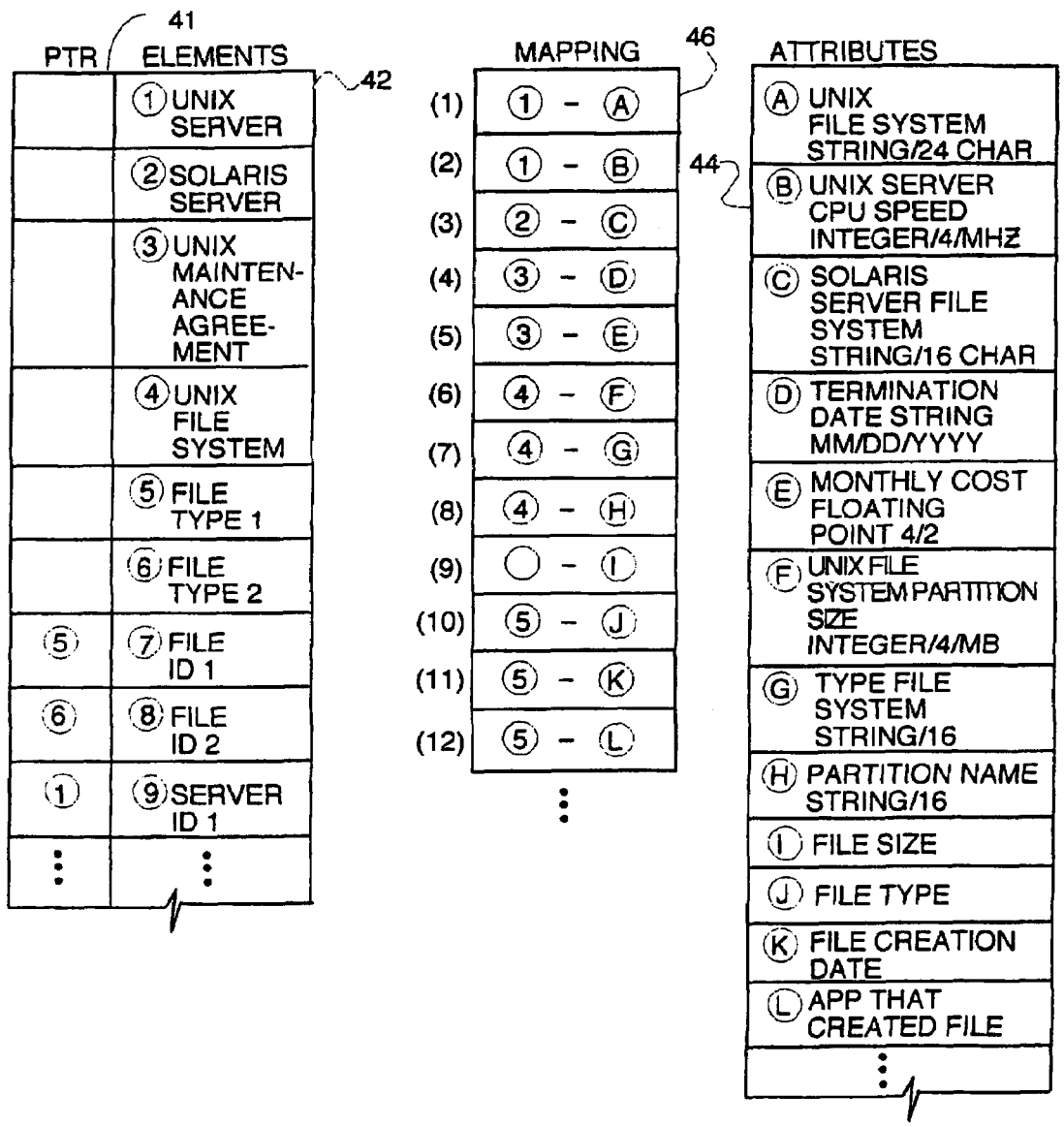
FIG. 11 is an example of the element/attribute data structure which defines the elements and defines the attributes of each element with semantic data and format data.

An element/attribute data structure 36 stores element entries for all the elements the system can identify and defines the attributes each element in the system has. The data structure 36 also serves as a catalog of all the instances found of a particular element type. An example of an attribute/element data structure 36 is shown in FIG. 11. In the preferred embodiment, this data structure is comprised of three tables. The first table, shown at 42 in FIG. 11, has an entry for each element definition and an entry for each instance of an element that has been found by the system with a pointer to the element definition. For example, elements 7 and 8 are file instances that have been found with pointers to element entries 5 and 6, respectively. This means that the file which the system found and gave an element identification File ID 1 is an instance of file type 1 defined by the attributes mapped to entry 5 in the element column. Likewise, the file instance found by the system and entered as an element at entry 8 is an instance of file type 2 defined by the attributes mapped to and which define the file element at entry 6. Likewise, the system found a server and assigned it ID 1 and made an entry at 9 in the element table. This entry has a pointer to entry 1 indicating the server instance at 9 is a UNIX server defined by the attributes mapped to entry 1. Only instances of elements have pointers in pointer column, and these instances define the elements that have been found in the system. The elements with pointer entries are a catalogue of everything that makes up the company.

Typically, the element definition will be semantic data naming the element or telling what the element is. Each element has one or more attributes which are defined in a second table shown at 44. Semantic data and form data in each entry of this second table names the attribute defined by that entry or defines what it is and what form the attribute data is to take, e.g., floating point, integer, etc. For example, entry A in this table is an attribute named Unix file system. This name is a string of alphanumeric symbols 24 characters long or fewer. Entry B is an attribute named UNIX server CPU speed which will be an integer of 4 digits or fewer with units of mHz. Entry E is an attribute named monthly cost which will be a floating point number with 4 digits to the left of the decimal and 2 digits to the right. These definitions are used to post process gathered data to the format of the definition for storage in the collected data table 28. The third table, shown at 46, is a mapping table that defines which attributes in the second table belong to which elements in the first table. For example, attribute A in table 44 is an attribute of element 1 in table 42, and attribute D is an attribute of element 3. There are subsystem relationships that are inherent in the data structure of FIG. 11, but not specifically identified. For example, element 4 "UNIX file system" is actually an attribute of UNIX server element 1 in table 42, and is defined at entry A in table 44.

Every system may have systems and subsystems. A containment table 38 defines which elements are sub-elements or subsystems of other elements. FIG. 16 is a table mapping element IDs to child element IDs.

A correlation table 40 in FIG. 10 stores the attribute data that allows a user to see the relationships between different user selected attributes over time. The correlation table supports user defined visual interface "widgets" of different types such as graphs or juxtaposition views between different attributes as well as other functions. This allows the user to compare different attributes over time such as server utilization versus maintenance costs. The correlation table is an optional element since the immediate value of the system is believed to be its ability to automatically gather attribute data, compare it to fingerprints, identify assets and automatically extract other important information management needs from documents, files and by sending messages to people who know the needed information. The correlation table and visual widgets are nice features in various species that have greater utility within the inventive genus. Likewise, the refresh table and agenda manager functions in FIG. 10 are attributes of useful species within the genus.

Returning to the consideration of FIG. 10, once all the attribute data has been stored in the collected data table 28, a comparison process compares the attribute data to a plurality of "fingerprints" shown generally as the data structures 50. These fingerprints combine with the element/attribute definitions stored in data structure 36 illustrated in FIG. 11, to completely define the elements, i.e., systems and subsystems, the system of FIG. 10 is able to automatically detect. The element/attribute definitions in data structure 36 define what each element is and which attributes that element has. The fingerprints shown at 50 are data structures which define rules regarding which attributes may be found for that element to be deemed to exist and logical rules to follow in case not all the attributes of an element definition are found. For example, some installs of software fail, and not all the files of a complete installation are installed. Other installations of suites of software allow custom installations where a user can install only some components or tools and not others. The fingerprints 50 contain all the rules and logic to look at the found attributes and determine if a failed installation has occurred or only a partial installation of some programs and/or tools has been selected and properly identify that asset to management. For example, if all the attributes of an Oracle database are found except for the actual executable program oracle.exe, the Oracle database fingerprint will contain one or more rules regarding how to categorize this situation. Usually the rule is that if you do not find a particular main executable file for a program, you do not have that program installed even if all its DLLs and other support files and satellite programs are found.

A rules engine process 52 uses the rules in the fingerprints and the definitions in the element/attribute data structure 36 as a filter to look at the collected attribute data in collected data table 28. If all the attributes of a particular element are found in the collected data, an entry in the element catalog data store is made indicating that the element is present. If only some of the attributes are present, the rules compare applies the rules in the fingerprint for that element to whatever attributes are found to determine if the element is a partial installation of only some tools or programs selected by the user or an installation failure and makes an appropriate entry in the element catalog 54.

Figure 21:
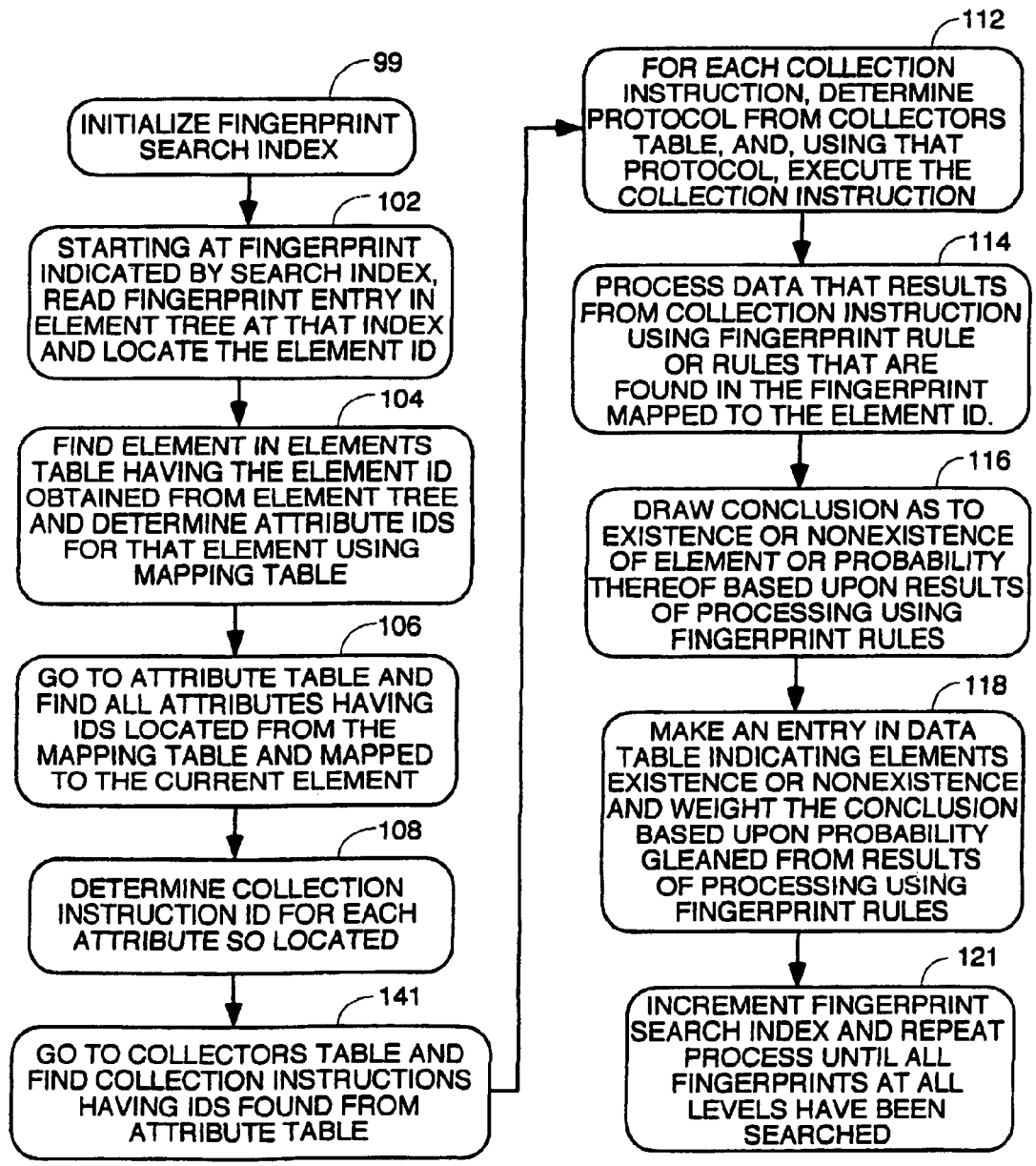
FIG. 21 is an example of a discovery process within the genus of processes to use the fingerprints and collection instructions defined in the data structures of FIGS. 12-19 to automatically gather data from entities in a business organization.

FIGS. 12 through 19 are examples of the core data structures which enable the system to run. Although not all data types and fingerprints and collectors are defined in FIGS. 12-19 for a typical system, FIGS. 12-19 are good examples of the core concepts. FIGS. 12-19 include: the definitions of very important elements or data types in every system; fingerprints for these important data types; examples of data collection instructions for various attributes; examples of actual data collected for these elements; examples of fingerprint rules used to evaluate collected data to determine if an element is present or not present; the relationships between these data elements and their attributes; and examples of parent-child element containment relationships for these type elements FIG. 21 is an example of a discovery process within the genus of processes to use the fingerprints and collection instructions defined in the data structures of FIGS. 12-19 to automatically gather data from entities in a business organization. The process of FIG. 21 also determines which of the elements defined in the data structures the organization has or does not have the element and/or the probabilities that the organization does or does not have each element. The data structures of FIGS. 12-19 define what the system expects to see or, more precisely, is capable of seeing using the process of FIG. 21 working with the data structures. The data structures of FIGS. 12-19 will be discussed jointly in conjunction with the discussion of the process of FIG. 21.

Referring to FIG. 21, step 99 initializes a fingerprint search index which is used to keep track of which fingerprint is currently being processed. Referring to the element tree data structure of FIG. 12, there is a top section called Types, starting at line 101, which defines all the different types of elements the system can recognize. The defined types are shared in that every instance of collected attribute data for a particular type element will have the same attributes as defined in the type section for an element of that type (class). The numbers in parenthesis next to each element type is the element ID.

There is a fingerprint section starting at line 103 which defines the various fingerprints that exist in the system and defines the types of elements the system can recognize from collected attribute data. There is also a data section 105 which defines the data format for each item of data representing an instance of an attribute and which also stores the instances of the attributes.

Each line below the types line 101 and above the fingerprint line 103, represents a different type element (class of asset) the system can gather attribute data about and automatically recognize from the attribute data. The element tree defines the structure of the data in the system. The indentation relationships in the element tree type section reflects the parent-child inheritance relationships between element types. For example, the file type element, ID=5, on line 121 has name and size attributes. The UNIX type on line 123 is a type of file element that inherits the attributes name and size of its parent type File element on line 121. The UNIX file type therefore has inherited attributes name and size and also has its own attribute "owner", and has an element ID of 10,5 indicating it has inherited attributes from element ID 5. The syntax and semantics of each entry in the element tree is shown at line 125 just below the title.

The indentations in the fingerprint section define the logical relationships in the discovery process of FIG. 21 which is followed to collect the attribute data when starting from a completely unknown network configuration and identify which elements are and are not present. For example, the first fingerprint that will be used is at line 107 and determines if a network is present. The network element fingerprint shows four attributes: the network ID, a mask value, a bottom IP address and a top IP address. This type of discovery process is different than the prior art because it starts from a completely unknown configuration and automatically discovers everything it needs using fingerprints to define attributes and collection processes to collect the values of those attributes and fingerprint rules to examine the collected data to determine if the element is there, partially there or not there.

In the prior art of monitoring systems, it was necessary to choose a monitoring system, identify a particular server to the monitoring system, tell the monitoring system what type of operating system the server was running and then install an agent on the server and/or every desktop in the LAN. The agent then goes out and discovers what type of network cards are installed, what processes are running etc. and reports back to the monitoring system. Thus, each time the monitoring system or agent software is modified, the agents had to be reinstalled on every server and desktop which is time consuming and expensive. The process of FIG. 21 and the data structures of FIGS. 12-19 are the enabling technologies that allow an entire business organizations assets to be found and catalogued without the huge overhead of installed agents and the labor of predefining to the monitoring system all the servers, desktops and operating systems on the LAN or LANs of the organization.

If a network is found, then the next step would be to determine all the network interface cards that are coupled to the network using the NIC fingerprint at line 109. The NICs are all coupled to computers, so the next question is what types of operating systems are running on those computers. The Solaris 2.7 fingerprint on line 111 is one type of fingerprint that can be used to determine if any of the computers are running this operating system. Other fingerprints not shown would usually be present for Windows NT, Windows 98, etc.

Typically, under each operating system fingerprint, there would be hundreds of other fingerprints defining many types of elements such as application program packages the attributes of which can be collected by invoking the proper function calls of the operating system. Once the type of operating system on a particular computer has been determined, the next thing the system would like to know is whether it is a web server. The HTTP fingerprint on line 113 is used to determine if the server is running a web server process.

The next question of interest to the system is who is the super user of the computer just located. That is the purpose of the fingerprint at line 115. Typically, the collection instruction in this type fingerprint will cause the system to send out an e-mail to an administrative person who knows the name of the super user with a request to send back an e-mail, although other means for collecting this data attribute may be encoded in the fingerprint. Next, the amount of memory needs to be known, and that is the purpose of the fingerprint at line 117. The CPU type is of interest next, and that is the purpose of the fingerprint at line 119.

The indentations in the data section starting at line 105 just track the indentations of the fingerprint section as the order of the fingerprints is the order in which data is collected. Multiple relationships are possible between data elements.

Line 127 is the data of an instance of a network found in the hypothetical example. This network has a network ID of 1.1.1.0, a mask value of 255.255.255.0, a bottom IP address of 1.1.1.2 and a top IP address of 1.1.1.254. Line 129 represents the data of an instance of a particular NIC that has been found with an IP address of 1.1.1.20 and a response attribute of 25 milliseconds.

Figure 12:
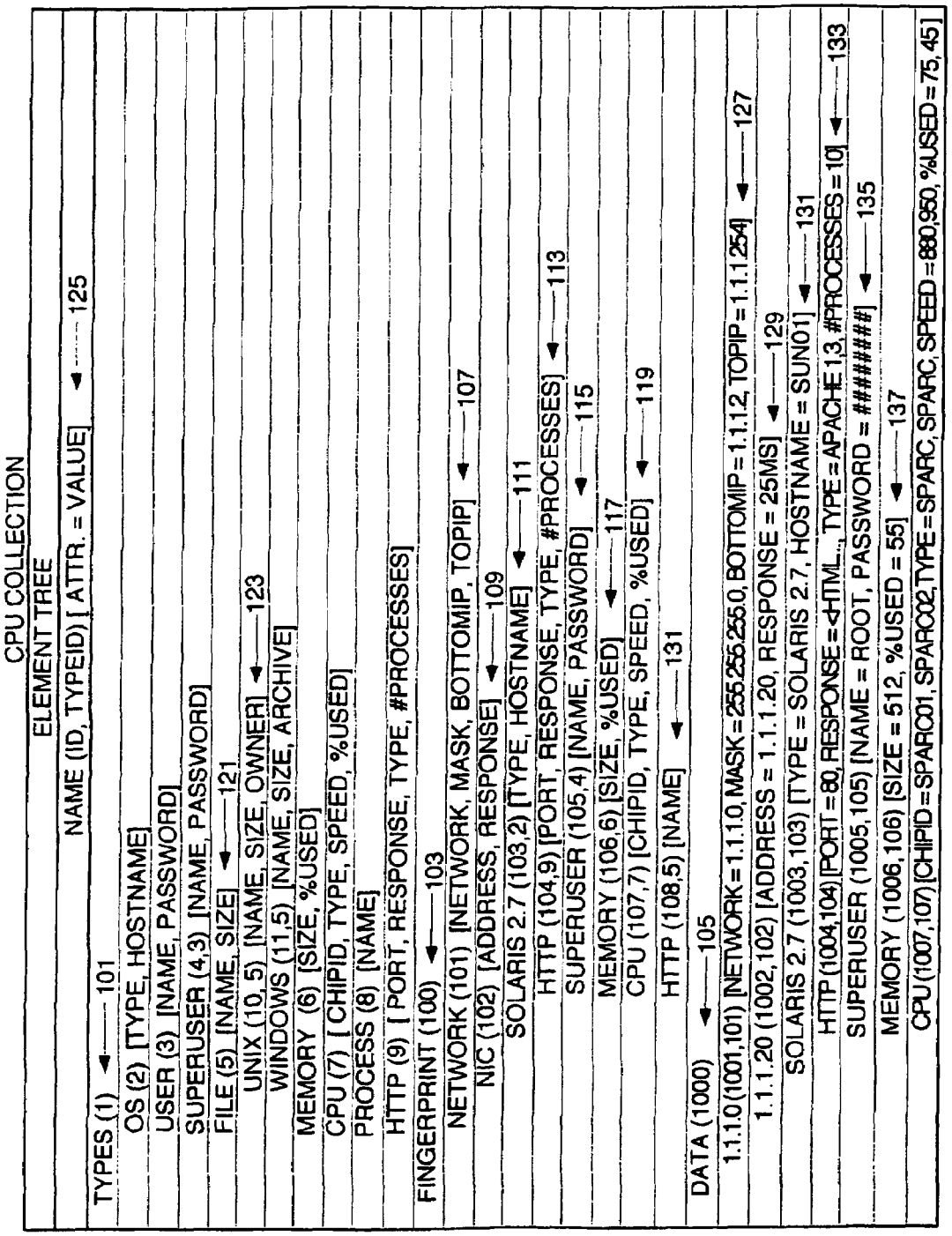
FIG. 12 is an element tree data structure.

Step 99 in FIG. 21 starts the automated data collection process by setting the search index pointer at line 107 in FIG. 12. Step 102 is the process of reading the fingerprint entry in the element tree at the location of the pointer (line 107 on this first pass through the loop) and determining the element ID to which this fingerprint pertains. In this case, the element ID is 101. Reference to the elements table of FIG. 13 shows that there is no type ID or collector ID for this element per se. In step 104, this element ID is used as a search key to search a mapping table to determine which attributes that element has. The mapping table is shown in FIG. 15A. The element ID 101 for the network element is mapped to attribute IDs 68, 69, 70 and 71.

Step 106 represents the process of using each of the attribute IDs located in step 104 as search keys in the attribute table of FIG. 14. In the example, all the attribute IDs 68, 69, 70 and 71 which are mapped to element ID 101 are located in the table of FIG. 14.

Step 108 represents performing the step of determining the collection instruction ID for each attribute mapped to the fingerprint and element currently being processed. One or more attributes can be collected through a single collection instruction. In alternative embodiments, the attributes will be obtained one at a time during each pass through the loop and the collection instruction ID for only one attribute will be found and executed on each pass through the loop and there will be a test at the end of the loop to determine if all collection instructions for all attributes mapped to the current fingerprint have been executed. This can be an inner loop within an outer loop with the outer loop processing one fingerprint per pass through the loop and the inner loop iterating as many times as there are attributes. When all the attributes have had their collection instructions processed in this alternative embodiment, the fingerprint rules are applied to the collected data and an appropriate entry is made in the data table regarding the existence, degree or probability of existence, or nonexistence of the element. Then the fingerprint search index pointer is moved to the next fingerprint to be processed and the processing starts again for the next fingerprint. In the embodiment of FIG. 15, all the attributes are determined in step 106 and all their collection instruction IDs are determined in step 108. The collection instruction IDs are determined by using the element ID as a search key in the elements table of FIGS. 10A and 10B and looking up the collector id in column 3 mapped to each attribute mapped to the element ID. In the example, these collector IDs are 208, 209, 210 and 211.

In step 141, the system goes to the collectors table of FIG. 18 and uses the collector IDs determined in step 108 to search for and find the collection instruction for each attribute mapped to the element and fingerprint currently being processed. Those collection instructions IDs are circled in FIG. 15A, and the collection instruction itself is in the Statement column of FIG. 18. The protocol to use is identified in the Method column.

Step 112 is the process of determining the protocol to use for each collection instruction for each attribute mapped to the fingerprint for the element currently being processed. This is done simply by reading the entry in the Method column for each of the collector IDs mapped to the element ID currently being processed. More than one method or protocol may be used in a single fingerprint to perform system identification by multiple means. Step 112 also represents the process of accessing the protocol library identified in the Method column and using the appropriate protocol from that library to execute the command or operation specified in the Statement column.

Step 114 is the process of applying the fingerprint logical rule or rules to the attribute data collected in step 112 for the element currently being processed to draw a conclusion regarding the probability of existence or nonexistence of the element whose fingerprint is currently being processed. This is done by using the element ID as a search key to search the fingerprints table of FIG. 17. In the example, element ID maps to two different rules defined in the Rule column. The seq column defines the sequence in which these rules are to be applied to the collected data. In the example, the first rule invokes a function call of an application programmatic interface to run a program to examine the collected network ID attribute data and determine if that is a valid network ID. If the network ID is valid, a true result is returned. The Trueweight and Falseweight columns give weighting factors to use if the result of application of the rule is true or false, respectively. Step 116 represents the process of drawing conclusions regarding the existence or nonexistence, or probability thereof, of the element to which the fingerprint currently being processed pertains.

In step 118, an entry for the element mapped to the fingerprint currently being processed is made in the data table of FIG. 19. Referring to FIG. 12, line 127, the attribute data for an instance of a network having element ID 101 is shown. This data instance has its own ID which is 1001. In FIG. 19, the values for each of the attributes of the fingerprint mapped to network element ID 101 are shown on data instance ID 1001 in the first column (this column is labeled Elementid, but, more precisely, should be labeled data instance ID). The second column indicates this attribute data was collected at a time corresponding to timestamp 40. The actual values for the four attributes of the network element specified in the fingerprint are shown in columns 3 through 6 with the column Attr1 containing the network ID, column Attr2 containing the mask value for this network.

Step 121 increments the fingerprint search pointer index to point at the next fingerprint to be processed. In the example, the next fingerprint to be processed would be on line 109 of FIG. 12. In alternative embodiments, before each fingerprint is used to collect attribute data and analyze it, configuration data is checked to make sure the fingerprint is "turned on", i.e., the system administrator wants new attribute data gathered about the element that corresponds to the fingerprint. Fingerprints that are "turned on" are referred to as "active". This functionality allows the system administrator to block gathering of attribute data about some or all elements. This can be done at every level of the hierarchical organization of fingerprints shown in FIG. 12 so that entire levels are blocked off or just some elements on certain levels are blocked off. In still other alternative embodiments, configuration data is used to turn fingerprints on or off and refresh schedule data is used to determine how often to collect the attribute data for each element. Each element can have its own refresh schedule. In this alternative embodiment, step 121 in FIG. 21 represents the process of picking another fingerprint which configuration data indicates is turned on and which the refresh schedule data indicates is ripe for another discovery effort. Thus, the process of FIG. 21 would be repeated until every "active" fingerprint which was ripe for processing had been processed.

The process described above to automatically gather attribute data and analyze it using fingerprint rules to determine the existence of the element is then repeated. In the example, the next fingerprint is for a network interface card. In gathering the attribute data for this type of element, the system would cycle through all the valid IP addresses of the network just found and send out a packet to each address to determine if a response was received. Each NIC which responds represents a device coupled to the network. Then, for each NIC that responds, the system wants to know the type of operating system the device is running and information about whether the device is a web server, has a super user and who that is, its memory size and CPU type, etc. To gather that information, each of the fingerprints on lines 111, 113, 115, 117, 119 and 131 of FIG. 12 is processed as described in FIG. 15A and FIG. 15B for each NIC that responds. That is the meaning of the indentation of lines 111, 113, 115, 117, 119 and 131 under the NIC fingerprint on line 109.

Figure 20A:
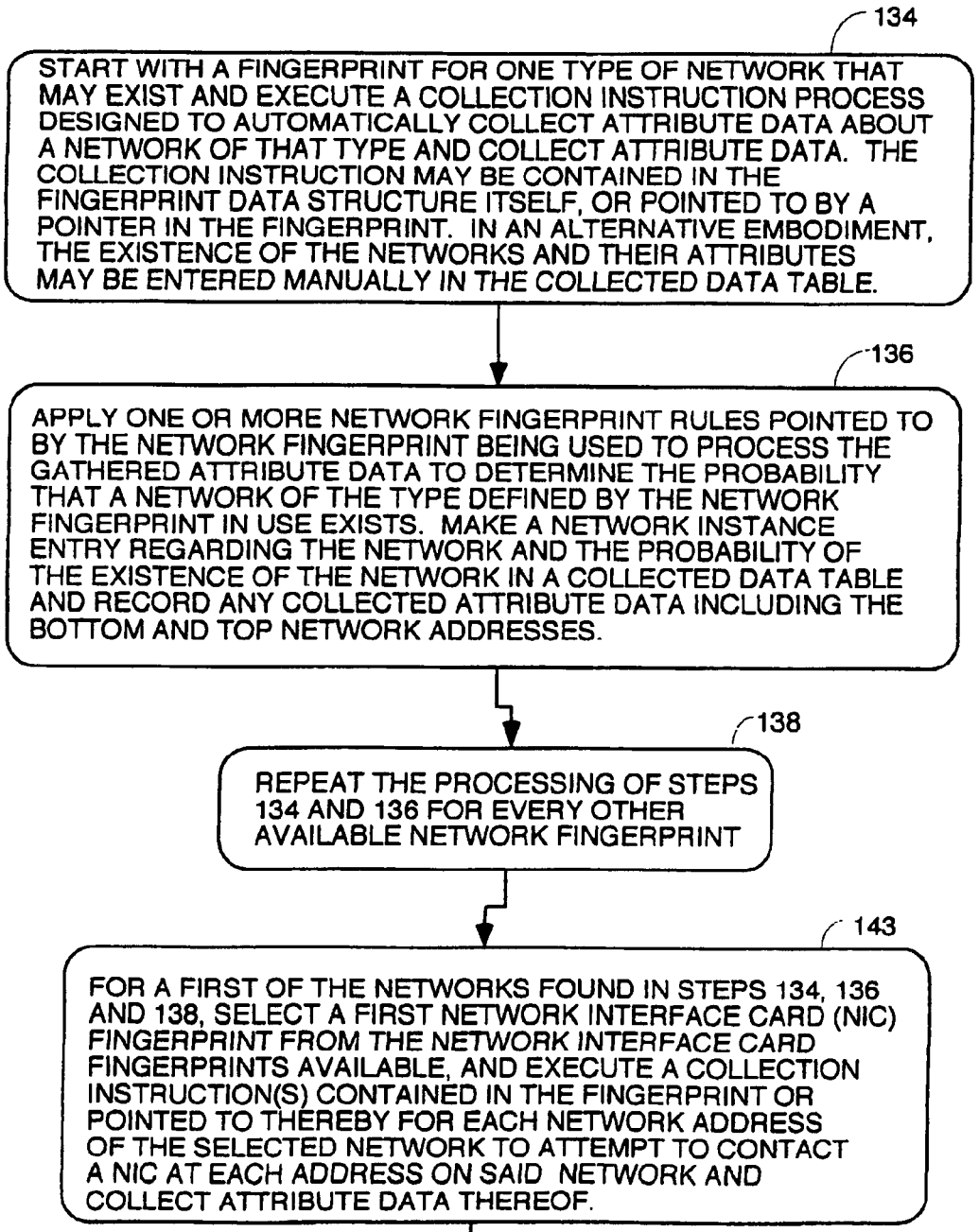
FIGS. 20A through 20C are a flowchart of a process to discover the assets in a system or designated portion of a system starting with no knowledge of the existence of any networks, servers or the operating systems thereof.
Figure 20B:
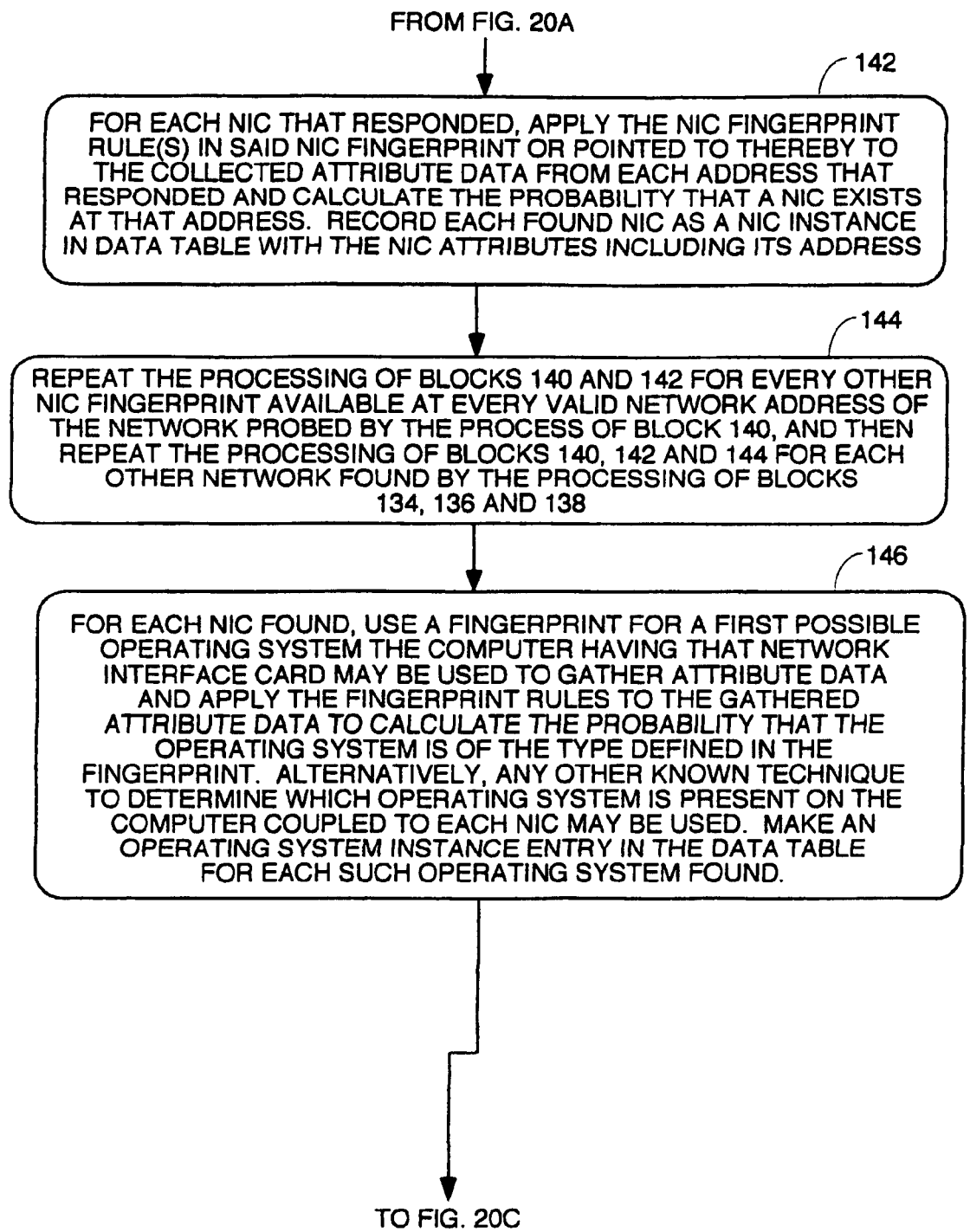
Figure 20C:
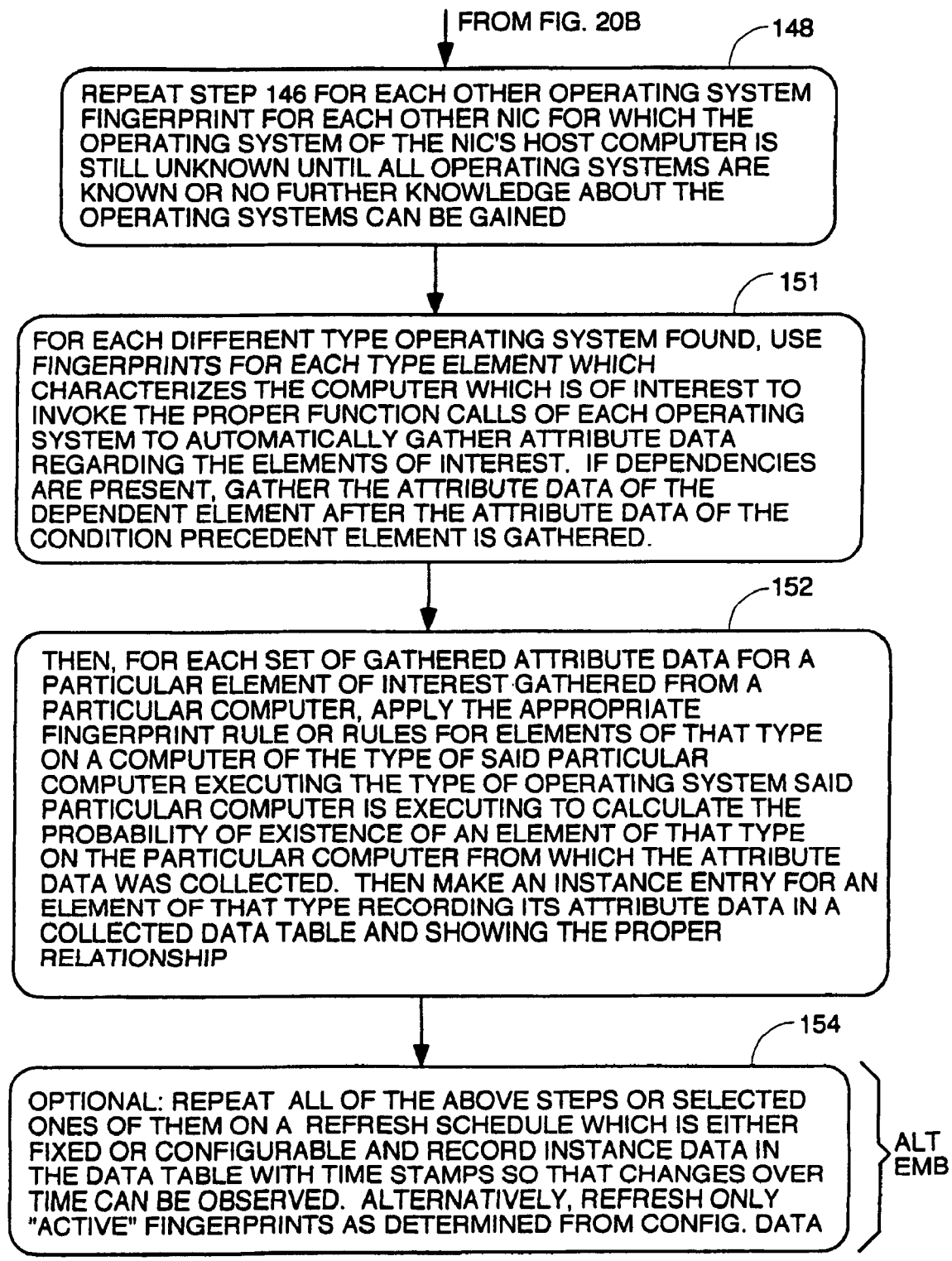

In some embodiments, the discovery process of FIGS. 20A through 20C will be performed completely the first time to discover all or a designated subset of networks, NICs, operating systems and all the other elements then existing in the system. After that is done, the fingerprints marked as active by configuration data may be used repeatedly according to refresh schedule data in a refresh table and collection calendar to gather attribute data. Fingerprints may be applied as the result of a user action. Collected attribute data is then analyzed with the fingerprint rules, and entries are made in the collected data table having timestamps so that how attribute data changes over time can be observed.

Turning to the exact details of the automated discovery process shown in FIGS. 20A through 20C, step 134 represents the step of starting with a fingerprints for one of the one or more different types of networks and executing collection instructions. These collection instructions are either in the network fingerprint or are found by following a pointer in the fingerprint to the collection instruction. The collection instruction automatically collects attribute data or at least attempts to do so. Sometimes the network will not respond to the collection attempts orchestrated by the fingerprint. That happens when the network fingerprint selected does not match the actual network in existence. This can happen when the type of network installed is unknown in the fully automatic process and a fingerprint is chosen at random from among all the network fingerprints available. In this case, the absence of attribute data will be recorded.

In the preferred embodiment, step 134 is accomplished by starting with one fingerprint for a potential network of a certain type and following a pointer in the network fingerprint to a collection instruction to gather attribute data for that type of network. The fingerprints corresponding to each element ID are stored in the table of FIG. 17. The collection instruction for each fingerprint is stored in the table of FIG. 18. The table of FIGS. 15A and 15B maps each element ID to the ID of a collector instruction and to the fingerprint for the element. Step 134 represents executing that collection instruction and gathering attribute data if possible.

In alternative embodiments, the existence of the networks and their attributes may be entered by hand in the collected data table since it is easy to do this.

In step 136, the rules in the network fingerprint used in step 134 are applied to the gathered attribute data, if any, to determine whether a network of the type defined by the network fingerprint exists. If so, the found network is recorded as a network instance in the elements table such as are illustrated in FIG. 19. The attributes of the found network including its top and bottom IP addresses are recorded in the collected data table. This has the effect of creating a map in the elements table of the networks that exist.

In step 138, the process of steps 134 and 136 is repeated using each of the other available network fingerprints to determine if any other networks are present, and, if so, to collect attribute data for these other networks.

For every network found, step 143 represents the process of selecting a fingerprint for one of the possible network interface cards (NICs) that may be coupled to the found network(s) to gather information about any NICs coupled to each network. This is done, on each network, by executing a collection instruction in the NIC fingerprint or pointed to by it for each of the network's valid addresses to attempt to contact a NIC at each address and gather attribute data about it. In the preferred embodiment, this is done by following a pointer in the fingerprint to the collection instruction. This phrase "following a pointer in the fingerprint to a collection instruction" or words to that effect includes using the element ID as a pointer in the fingerprint table to the fingerprint and also as a pointer to the collection instruction for that fingerprint in the collectors table of FIG. 18. The collection instruction is performed once for each valid address of each network. This constitutes an attempt to contact a NIC at that address in a language it understands.

As symbolized by step 144, this execution of a collection instruction is done at every address on the network being processed for which the NIC type is unknown using every NIC fingerprint until one of the fingerprints works or one runs out of NIC fingerprints and a conclusion can be drawn. That conclusion is that either there is no NIC at that address or it is not a type of NIC for which a fingerprint has been defined. Once a NIC has been found at a particular address, no further fingerprints need be used on that address, and processing can move to the next address until all addresses of the network have been processed. Then, as represented by step 144, all the addresses of all the other known networks are similarly processed to find the NICs assigned thereto or draw the conclusion that no NIC at all or a foreign NIC for which there is no fingerprint is assigned to certain addresses.

Once the NIC fingerprint that works, if any, is found, the collection instructions pointed to by that NIC fingerprint are used to gather attribute data about the NIC at that address. This process is repeated at each address upon which a NIC is found. In other words, as symbolized by steps 144, this attribute data collecting process is repeated at every valid address of every network to find all the NICs. The whole process can be done one network at a time or in parallel using multiple data collector processes working simultaneously.

Step 142 represents the process wherein the rule or rules in the NIC fingerprint currently being processed are applied to the gathered attribute data to calculate the probability that a NIC instance exists at the address being processed. For each found NIC, a NIC element instance with all the attributes of the NIC is recorded in the elements and collected data tables. As symbolized by step 144, the process of applying the appropriate NIC fingerprint rules to attribute data collected for each address which responds, is repeated for every address of every network until all NICs are found.

For each NIC that is found, processing represented by step 146 determines what type of operating system the device having the NIC is executing. This can be done in several known ways such as by sending a specific type of network packet to the unknown machine at the network address. This network packet has a defined or undefined response packet. Each operating system deals with arrival of such a packet differently. By examining the response packet, it is possible to determine which type of operating system the unknown machine is running.

Alternatively, the fingerprint for each different possible type of operating system and version can be used to point to a collection instruction list which controls a data collector process to attempt to invoke a particular function call of a programmatic interface (API), a service, utility, or program of the operating system. Each operating system has a different set of APIs, services, utilities and programs. If the operating system responds to the attempt to invoke a particular function call of an API for a known type of operating system, then the operating system must be of that type since all other operating systems would not respond or would respond in a different or unexpected manner. Thus, by trial and error elimination, the type of operating system can be determined using fingerprints in one of the species represented by step 146.

Once the type of operating system is determined, the proper fingerprint for that type operating system can be used to gather more attribute data that defines the operating system itself, and the appropriate operating system fingerprint rules can be applied to the gathered attribute data to calculate the probability that the operating system exists and is of the type the fingerprint being used defines, as symbolized by step 146.

Once the operating system type has been determined and its attribute data gathered, an operating system instance entry is made in the element table to indicate that device X is running operating system Y where X is the particular device host name and Y is the type of operating system, as symbolized by step 146.

Then, step 146 is repeated for every NIC that responded to determine the operating system of every computer on the network, as symbolized by step 148.

Now that the operating system is known for every device on all the networks (unless a rogue operating system or version of an operating system with no fingerprint is present), many different things of interest about each device can be determined by invoking the proper function calls of various APIs, services, utilities, or programs of the operating system. These things include but are not limited to: whether it is a web server; who its super user is; the super user password; how much memory it has; what type CPU it has and the speed thereof; what type of file system(s) it has and which file system is mounted; the files that are in the file system; what software packages are installed on the computer; and, which software processes are in execution at any particular time. Assuming there is a fingerprint for each of these things and there is a way to obtain this data about each device, each of these things may be determined by using a fingerprint for an element of that type.

The fingerprints for these other elements of interest can be used in any order, but sometimes there are dependencies built into the fingerprints. This means that attribute data about one element cannot be gathered until the attributes of another fingerprint have been gathered. For example, sometimes attribute data about a child element cannot be gathered until the attribute data for a parent element has been gathered. If an element has a dependency, in the preferred embodiment, this fact will cause its attributes to not be gathered if the element upon which it is dependent has not had its attributes gathered. However, in the preferred embodiment, there is a refresh table which governs the frequency at which each fingerprint is used, so if the element with the dependency has had its dependency condition satisfied the next time the fingerprint for the element is scheduled to be used, the attributes will be gathered at that time. In alternative embodiments, whenever the parent element, or whatever other element is a condition precedent to gathering the attributes of the element in question, has its attributes gathered, that will automatically trigger gathering of attributes of all other elements which are dependent upon it.

The fingerprint that is used to determine each element may be, and usually is, unique to the particular type of operating system. For example, the fingerprint to determine CPU type and CPU speed is usually different as between an IBM server running AIX and a Sun server running Solaris 2.7. This is because at least the collection instructions are different. However, collection instructions may be shared between different fingerprints for the same element to be gathered from different operating systems or different versions of the same operating system. For example, if the function call that needs to be invoked to determine the amount of memory is the same on an HP UNIX machine and a Sun Solaris 2.7 machine, the memory fingerprint collection instruction for these two different type machines can be identical.

Step 151 represents the process of running the various fingerprints for the different things about the machine that are of interest once the operating system type is known. Step 151 represents this process generically, and the different species mentioned above to handle dependencies are all symbolized by step 151. To gather attribute data, the collection instruction associated with each fingerprint is executed and attribute data is collected about each element. An entry is then made in the collected data table for each element that includes the elements attributes data and, in some embodiments, the probability or confidence level that it exists. In some embodiments, the instance entry in the element table is only made for elements where the probability or confidence level is above a certain level, which can be configurable in some embodiments. Step 152 represents this processing.

The instance entry in the element table is entered in such a way to show the relationship to any parent elements or super systems of which the element is a subsystem. For example, referring to FIG. 12, the NIC entry on line 129 is shown as indented to indicated there is some data structure to indicate that this NIC is coupled to the network corresponding to the data entry on line 127. Likewise, the data entry on line 131 indicates that the computer owning the NIC corresponding to the data entry on line 129 is running a Solaris 2.7 operating system. Likewise, the data entries on lines 133, 135 and 137 all are structured to indicate they are elements of the computer running the Solaris 2.7 operating system memorialized on line 131 and coupled to the network memorialized on line 127 by the NIC memorialized on line 129.

Step 154 represents the alternative embodiments of the process where all the steps 134 to 152 are repeated at a frequency defined by a refresh interval which is either fixed or configurable and wherein each entry for an element in the collected data table is time stamped so the changes in the attribute data for each element over time can be observed. Step 154 also represents the alternative embodiments where each fingerprint has its own configurable or fixed refresh schedule. Step 154 also represents the alternative embodiments wherein prior to using any fingerprint, configuration data is checked to make sure the fingerprint is "active" and only using the fingerprints that are marked as "active" to collect and analyze data.

OTHER EMBODIMENTS

The foregoing described embodiments of the system described herein are provided as illustrations and descriptions. They are not intended to limit the system described herein to precise forms described. In particular, the applicant contemplates that functional implementation of system described herein described herein may be implemented equivalently in hardware, software, firmware, or other available functional components or building blocks. Furthermore, the specific discussions of data nodes and type nodes is not meant to preclude the possibility that the system described herein may use, manage and/or operate on one or more different varieties of nodes. Other variations and embodiments are possible in light of above teachings, and it is thus intended that the scope of system described herein not be limited by this detailed description, but rather by claims following.

The system described herein has now been described with reference to specific embodiments. Other embodiments will be apparent to those of skill in the art. In particular, an information appliance has generally been illustrated as a personal computer. However, the devices discussed herein can include any information appliance for interacting with a remote data application, and could include such devices as a digitally enabled television, cell phone, personal digital assistant, laboratory or manufacturing equipment, etc. It is understood that the examples and embodiments described herein are for illustrative purposes and that various modifications or changes in light thereof will be suggested by the teachings herein to persons skilled in the art and are to be included within the spirit and purview of this application and scope of the claims.

All publications, patents, and patent applications cited herein or filed with this application, including any references filed as part of an Information Disclosure Statement, are incorporated by reference in their entirety.

What is claimed is:

1. A method of using a computer programmed with an automatic inventory discovery system to discover the existence and attributes of a plurality of assets of an entity and to keep track of said inventory over time even as assets are changed comprising:

A) using a computer programmed by an automatic inventory discovery system to probe one or more networks to which assets used by an entity are coupled to detect responding addresses B) for each responding address, using a fingerprint from a plurality of fingerprints to determine the type of asset present at said responding address, said determination being made by attributes gathered from said responding address, each fingerprint providing a definition of a type of asset which can be recognized by said automated inventory discovery system, said definition provided in each said fingerprint by inclusion of a list of attributes said asset can have, each attribute listed in said fingerprint definition either including a collection instruction or pointing to a file containing a collection instruction which can control a collection computer to gather said attribute from a device at said responding address, and using said collection instruction for each attribute to control a computer to collect said attribute;

C) using one or more complete or partial fingerprint matching rules to compare attributes collected from said responding address to attributes listed in said fingerprint, and drawing a conclusion as to the existence or non existence at said responding address of an asset of the type defined by said fingerprint and making an entry in a data repository storing records for all assets found by said automated inventory discovery system and their attributes for each attribute found;

D) repeating the process of using other fingerprints in said plurality of fingerprints so as to discover as many instances of assets coupled to said one or more networks as can be discovered using said fingerprints and their attributes and making entries in said data repository for said discovered assets and their attributes so as to build in said data repository an inventory of particular instances of assets of types which can be recognized using said fingerprints;

E) using a plurality of attributes gathered about each instance of an asset to create a unique a signature data set for said instance of said asset, said signature data set being unique to said particular instance of an asset, which means that said signature data set for each particular instance of a type of asset can be used to identify said particular instance of an asset when attributes said particular instance of said asset are fetched again in subsequent iterations of steps B and C;

F) storing said signature data set;

G) repeating the process of using said fingerprints to scan said network or networks from time to time to gather attributes, each said scan after a first scan being referred to as a subsequent scan;

H) using said signature data sets and signature data set matching rules to compare each said signature data set to attributes gathered in each subsequent scan so as to ascertain whether said asset to which said signature data set pertains still exists and is coupled to said network or networks and so as to prevent double counting of said asset in inventory thereby providing the ability to track assets in inventory over time including changes therein.

2. The method of claim 1 further comprising:

using weighted partial fingerprint matching rules in steps C and D to compare collected attributes to said fingerprints to draw conclusions as to whether an instance of a type of asset identified by said fingerprint has been found or not, said weighted matching rules finding matches if one or more predetermined more heavily weighted attributes in a fingerprint match attributes found in steps B, C and D;

wherein step H is carried out by matching each said stored signature data set for an instance an asset against said plurality of attributes fetched in said subsequent scan using full matching rules or partial signature data set matching rules in which matches on some attributes that were used to make up said signature data set are weighted more heavily than matches on other attributes that were used to make up said signature data set, and a match can be found if matches exist between one or more attributes in said signature data set which are more heavily weighted than other attributes in said signature data set and attributes collected on a said subsequent scan so as to determine if an instance of an asset which is found on a subsequent scan is the same instance of said asset as has been previously detected even if the attributes of said instance of said asset which were used to generate a signature data set for said instance of said asset have changed since said instance of said asset was last detected.

3. The method of claim 2 step H wherein some attributes used to generate said signature data set are weighted more heavily than other and wherein said partial signature data set matching rules are used in a process where matches on attributes which are more heavily weighted than other attributes can cause matches to be declared even when matches are not found for all the attributes which went into generating said signature data set for a particular instance of a type of asset.

4. The method of claim 2 wherein a history of signature data sets for an instance of an asset is maintained for querying and viewing.

5. The method of claim 2 wherein:

said signature data set comprises a multi-part stored data element representative of said instance of said asset to which said signature data set applies and its attributes.

6. The method of claim 1 wherein step B comprises using fingerprints at a first level of a hierarchical fingerprint tree to determine what type of operating system is controlling a computer asset which coupled to said responding address or what other type of asset is located at each responding address, and then using further fingerprints nested under the fingerprint at said first level which successfully identified the type of operating system or asset at said responding address to identify further attributes which exist for said asset coupled to said responding address.

7. The method of claim 6 wherein step C further comprises the steps:

assigning weighing factors to one or more of said attributes in at least some of said fingerprints;

using said weighing factors in any fingerprint with weighted attributes in said matching process of step C such that partial matches on some attributes which are more heavily weighted than other attributes will cause a match to be found even though there is not a match on all said attributes.

8. The method of claim 1 wherein step C further comprises the steps:

if said matching is a partial matching using a partial matching rule, updating said attribute data stored about an instance of an asset with any collected attribute data about said instance which is changed from attribute data previously stored about said asset, and if any attributes used in said signature data set are changed, updating said signature data set using said changed attribute data.

9. The method of claim 1 wherein said plurality of fingerprints are organized into a hierarchical tree with a top level being fingerprints which identify by their attributes all types of assets which said automatic inventory discovery system can recognize, and wherein steps A and B comprises the steps:

initializing a fingerprint search index at a position in said hierarchical tree of fingerprints which controls said automated inventory discovery system to determine if a network is present and using said fingerprint to determine if a network is present;

using fingerprints at a next level down in said hierarchical tree of fingerprints to determine what network interface cards are installed on said network and are responding;

using fingerprints at a next level down in said hierarchical tree of fingerprints to determine which operating systems are installed on devices coupled to said network through said network interface cards discovered previously;

using fingerprints at other levels down in said hierarchical tree of fingerprints to determine other attributes about devices coupled to said network through said network interface cards discovered previously using element IDs that are mapped to attribute IDs which are mapped to said collection instructions which are used to control said collection computer to collect said attributes;

and wherein said rules.

10. The method of claim 1 wherein steps G and H are carried out to gather attribute data on said subsequent scans and use both full and partial signature data set matching rules to determine if an instance of an asset has been found and counted in inventory before, said step of using both full and partial signature data set matching rules comprising first comparing attribute data collected on said subsequent scan using a full signature data set matching rule which requires all attributes which went into generating said signature data set for an instance of an asset to exactly match attribute data collected on said subsequent scan, and, if an exact match does not exist, using a partial matching rule to compare said signature data set to attribute data collected on said subsequent scan and declaring a match if at least some of said attributes that went into making up said signature data set match attributes collected on said subsequent scan.

11. The method of claim 10 wherein said step of using a partial matching rule comprises the steps of comparing attributes of said signature data set to said attributes gathered during said subsequent scan, and declaring a match for the instance of said asset to which said signature data set applies if a predetermined number of attributes in said signature data set for said instance of said attribute match attributes collected on said subsequent scan.

12. The method of claim 10 wherein said step of using a partial matching rule comprises the steps of comparing attributes of said signature data set to said attributes gathered during said subsequent scan and declaring a match for the instance of said asset to which said signature data set applies if a predetermined number of attributes in said signature data set for said instance of said attribute match attributes collected on said subsequent scan, and further comprising:
- detecting when said second plurality of characteristics varies from characteristics indicated by said signature data set;
- updating said signature data set when said comparing indicates a difference.

13. The method of claim 10 wherein said step of using a partial matching rule comprises the steps of comparing attributes of said signature data set to said attributes of said subsequent scan and declaring a match for the instance of said asset to which said signature data set applies if a predetermined number of attributes in said signature data set for said instance of said attribute which are more heavily weighted than other attributes in said signature data set match attributes collected on said subsequent scan.

14. The method of claim 1 further comprising the steps:
- determining if a particular asset detected in a previous scan was not detected again on a subsequent scan;
- if an asset detected on a previous scan is not detected on a subsequent scan, searching attribute data detected on said subsequent scan to determine if the asset has been moved to or can be identified with another server;
- if the asset has been moved to or can be identified with another server, updating automated inventory records accordingly; and
- if the asset that disappeared cannot be located in the attribute data collected in said subsequent scan, removing said asset from said automated inventory records.

15. The method of claim 14 wherein steps A, B and C comprise the steps:
- using fingerprints to determine the existence or non existence of one or more networks and addresses on said one or more networks which are responsive;
- at each active address, using one or more fingerprints to determine a network card MAC address;
- at each active address, using one or more fingerprints to determine a disk drive serial number; and
- at each active address, using one or more fingerprints to determine the serial number of an operating system controlling a computer at said active address;
- comparing said MAC address, said disk drive serial number and said operating system serial number, or some sub-combination of said MAC address, said disk drive serial number and said operating system serial number, hereafter referred to as "basic attributes," gathered from an asset at a first active address against the basic attributes gathered from all assets which are responsive at said addresses on said one or more networks and determining if said basic attributes of said asset at said first active address matches the basic attributes of any asset previously discovered on any previous scan, and, if so, repeating the comparison process for basic attribute data gathered from an asset at another active address against basic attribute data of any asset previously discovered on any previous scan, and, if there is a match, repeating said comparison process for basic attribute data gathered from each said active address until all active addresses are exhausted, and if any basic attribute data does not match basic attribute data of any asset using all of said MAC address, said disk drive serial number and said operating system serial number or some sub-combination of said MAC address, said disk drive serial number and said operating system serial number, creating a new asset in said data repository storing records of assets found by said automatic inventory discovery system and the attributes thereof using at least said basic attribute data, and if there is a partial match on said basic attribute data at any active address and basic attribute data of any device previously discovered, updating basic attribute data for said previously discovered asset with whatever basic attribute data has changed using the latest values thereof.

16. The method of claim 1 wherein said attributes which define said signature data set of each instance of a computer type asset comprise two or more of:
- a network adaptor card serial number;
- an Ethernet MAC (Media Access Control) address;
- a CUP serial number;
- an operating system identification/registration number;
- a CPU clock speed;
- installed memory identifications; and
- installed hard disk drive identifications.

17. The method of claim 1 wherein step H is performed by:
- comparing separable portions of said signature data set to collected attribute data from each instance of an asset such that a match of attributes from said instance of an asset to a majority of said separable portions of said signature data set indicates a match for an instance of an asset found by said automated inventory discovery system to an instance of an asset whose attributes are stored in said data repository and which is associated with said signature data set.

18. The method of claim 1 wherein step E is carried out by generating a set of integer values as said signature data set by mathematically deriving said integer values from said attributes of said instance of said asset with which said signature data set is associated.

19. The method of claim 1 wherein steps A and B include the steps:
- using fingerprints arranged in hierarchical order to determine whether a network exists, and, if a network exists, which addresses on said network are responding, and, at each responding address, what type of asset is responding and what operating system, if any, controls said asset and
- using information gathered regarding said type of asset at each responding address and the operating system, if any, controlling said asset to control the selection of further fingerprints to control the type of attributes fetched and the manner in which said attributes are fetched and matched against other attributes gathered on previous scans, if any.

20. The method of claim 1 wherein step E is carried out by generating said signature data set for each instance of an asset from un-correlated attributes of said instance of said asset where un-correlated attributes mean attributes that are independent of each other such that when one attribute used to generate said signature data set changes, the other attributes used to generate said signature data set do not also change.

21. An automated inventory discovery apparatus able to uniquely identify multiple assets coupled to the networks of an entity comprising:

a computer executing a query process able to determine the existence of one or more networks and determine addresses on said networks which are responding and request and receive from devices at said responding addresses data defining attributes of multiple assets coupled to said network(s) at said responding addresses, said attributes characterizing each said asset, said query process using one or more fingerprints from a plurality of fingerprints to determine the type of asset present at each said responding address, and the operating system, if any, controlling each said asset, said determination being made from attributes gathered from each said responding address, each fingerprint providing a definition of a type of asset which can be recognized by said automated inventory discovery system, said definition provided in each said fingerprint by inclusion of a list of attributes assets of the type associated with said fingerprint will have, each attribute listed in said fingerprint definition either including a collection instruction or pointing to a file containing a collection instruction which is used to control a collection computer to rather said attribute from an asset at said responding address;

a computer programmed to use a matching process comprised of using one or more complete and/or partial matching rules to compare attributes collected from each said responding address to attributes listed in said fingerprint, and draw a conclusion as to the existence or non existence at said responding address of an asset of the type defined by said fingerprint, and making an entry in a data repository storing records for all assets found by said automated inventory discovery system and their attributes for each attribute found, and if a partial match indicates an asset previously found is present but one or more of its attributes have changed, updating any changed attributes for said asset in said data repository;

a computer executing a signature data set generation process which generates from attributes collected from each instance of an asset found by said one or more computers executing said query and matching processes a unique signature data set for storage and association with said instance of said assets;

a computer executing a signature data comparison process which gathers attribute data from multiple assets coupled to said one or more networks in multiple subsequent scans and compares said gathered attributes using full matching rules, and, if no full match is found, using partial matching rules to compare signature data sets for assets which have previously been found and recorded with their attributes in said data repository to attributes collected during said multiple subsequent scans so as to determine, by virtue of full or partial matches between said gathered attributes and said signature data sets, which assets whose attributes were collected in one or more of said subsequent scans are assets which have been previously counted by said automated inventory discovery apparatus.

22. The system of claim 21 wherein said signature data comparison process includes:

a partial matching process which is carried out for each particular instance of an asset when there does not exist a full match between attributes gathered on a subsequent scan and attributes of said signature data set, said partial matching process using partial matching rules which declare a match when at least some of said attributes gathered from a device on a subsequent scan match attributes which are part of a signature data set associated with a previously discovered asset and which are more heavily weighted than other attributes in said signature data set.

23. A computer readable medium which is any volatile or nonvolatile memory capable of storing computer executable instructions, said computer readable medium storing computer executable instructions which, when executed, control said computer to perform the following process:

A) using a computer programmed by an automatic inventory discovery system to probe one or more networks to which assets used by an entity are coupled to detect responding addresses;

B) for each responding address, using a fingerprint from a plurality of fingerprints to determine the type of asset present at said responding address, said determination being made by attributes gathered from said responding address, each fingerprint providing a definition of a type of asset which can be recognized by said automated inventory discovery system, said definition provided in each said fingerprint by inclusion of a list of attributes said asset can have, each attribute listed in said fingerprint definition either including a collection instruction or pointing to a file containing a collection instruction which can control a collection computer to gather said attribute from a device at said responding address;

C) using one or more complete or partial matching rules to compare attributes collected from said responding address to attributes listed in said fingerprint, and drawing a conclusion as to the existence or non existence at said responding address of an asset of the type defined by said fingerprint and making an entry in a data repository storing records for all assets found by said automated inventory discovery system and their attributes for each attribute found, and if a partial match indicates an asset previously found is present but one or more of its attributes have changed, updating any changed attributes for said asset in said data repository;

D) repeating the process of using fingerprints in said plurality of fingerprints so as to discover as many assets coupled to said one or more networks as possible and make entries therefor in said data repository so as to build in said data repository an inventory of particular instances of assets of all the types which can be recognized using said fingerprints;

E) using attributes gathered about each instance of an asset to create a unique signature data set for said instance of said asset, said signature data set being unique to said particular asset, which means that said signature data set for each particular instance of a type of asset can be used to identify said particular instance of said asset when attribute data about said particular asset is fetched again in subsequent scans of said one or more networks;

F) storing said signature data set;

G) repeating the process of scanning said network or networks using said plurality of fingerprints from time to time to gather attributes, each said scan after a first scan being referred to as a subsequent scan;

H) using said signature data sets and full and partial signature data set matching rules to compare each said signature data set to attributes gathered in each subsequent scan so as to ascertain whether said asset to which said signature data set pertains still exists and is coupled to said network or networks and so as to prevent double counting of said asset in inventory thereby providing the ability to track assets in inventory over time including changes therein.

24. A computer readable medium which is any volatile or nonvolatile memory capable of storing computer executable instructions and storing computer executable instructions that when executed by a computer cause said computer to perform the process of claim 23 to generate a signature data set for each instance of a plurality of assets coupled to said one or more networks, and further performing the following steps:

using weighted partial matching rules in steps C and D to compare collected attributes to attributes in said fingerprints to draw conclusions as to whether an instance of an asset type identified by said fingerprint has been found or not, said weighted partial matching rules finding matches if one or more predetermined more heavily weighted attributes in a fingerprint match attributes found in a scan of said one or more networks;

and wherein step H is carried out by matching each said stored signature data set for an instance an asset against said plurality of attributes fetched in a subsequent scan using full matching rules to compare attributes collected in a subsequent scan to each signature data set for each instance of an asset previously found, and, if for any particular instance of an asset there is not a full match to said signature data set stored for said instance of an asset, using one or more partial matching rules in which matches on predetermined attributes are weighted more heavily than matches on other attributes, and a match will be found if one or more of said more heavily weighted attributes in said signature data set match attribute data collected on said subsequent scan, said match being a declaration that an instance of an asset which is found on a subsequent scan is the same instance of said asset as has been previously detected even if some attributes of said instance of said asset have changed.

* * * * *